United States Patent
Ota et al.

(10) Patent No.: US 11,280,987 B2
(45) Date of Patent: *Mar. 22, 2022

(54) ZOOM LENS AND IMAGING APPARATUS

(71) Applicant: FUJIFILM Corporation, Tokyo (JP)

(72) Inventors: Motoari Ota, Saitama (JP); Masaru Yonezawa, Saitama (JP); Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 307 days.

This patent is subject to a terminal disclaimer.

(21) Appl. No.: 16/542,105

(22) Filed: Aug. 15, 2019

(65) Prior Publication Data
US 2020/0064602 A1 Feb. 27, 2020

(30) Foreign Application Priority Data
Aug. 21, 2018 (JP) .............................. JP2018-154926

(51) Int. Cl.
*G02B 15/14* (2006.01)
*G02B 15/167* (2006.01)

(52) U.S. Cl.
CPC ....... *G02B 15/1461* (2019.08); *G02B 15/167* (2013.01)

(58) Field of Classification Search
CPC ... G02B 15/14; G02B 15/1461; G02B 15/167
USPC ............................................... 359/676, 684
See application file for complete search history.

(56) References Cited

U.S. PATENT DOCUMENTS

| | | | |
|---|---|---|---|
| 2011/0317279 A1 | 12/2011 | Takahashi | |
| 2014/0268340 A1 | 9/2014 | Ryu | |
| 2015/0234165 A1 | 8/2015 | Sakamoto | |
| 2015/0301319 A1* | 10/2015 | Komatsu | G02B 27/1013 359/684 |
| 2017/0254992 A1 | 9/2017 | Iriyama | |
| 2018/0299656 A1* | 10/2018 | Yonezawa | G02B 13/02 |

FOREIGN PATENT DOCUMENTS

| | | |
|---|---|---|
| JP | 2001-356381 A | 12/2001 |
| JP | 2003-241096 A | 8/2003 |
| JP | 2012-008344 A | 1/2012 |
| JP | 2013-003384 A | 1/2013 |
| JP | 2015-152798 A | 8/2015 |
| JP | 2017-161566 A | 9/2017 |
| JP | 2017-203912 A | 11/2017 |

(Continued)

OTHER PUBLICATIONS

An Office Action; "Notice of Reasons for Refusal", mailed by the Japanese Patent Office dated Jun. 8, 2021, which corresponds to Japanese Patent Application No. 2018-154926 and is related to U.S. Appl. No. 16/542,105; with English language translation.

*Primary Examiner* — James R Greece
(74) *Attorney, Agent, or Firm* — Studebaker & Brackett PC

(57) ABSTRACT

The zoom lens, in order from the object side, a positive first lens group that does not move during zooming, a negative second lens group that moves during zooming, a negative third lens group that moves during zooming, at least one lens group that moves during zooming, and a rear group that does not move during zooming. All distances between the lens groups adjacent to each other change during zooming. The zoom lens satisfies predetermined conditional expressions.

19 Claims, 22 Drawing Sheets

EXAMPLE 1

(56) References Cited

FOREIGN PATENT DOCUMENTS

| | | |
|---|---|---|
| JP | 2017-203927 A | 11/2017 |
| JP | 2020-016808 A | 1/2020 |
| WO | 2014/115230 A1 | 7/2014 |

\* cited by examiner

EXAMPLE 1

EXAMPLE 1

WIDE

MIDDLE

TELE

EXAMPLE 2

EXAMPLE 3

WIDE

TELE

EXAMPLE 4

WIDE

TELE

EXAMPLE 5

WIDE

TELE

EXAMPLE 6

EXAMPLE 7

WIDE

TELE

EXAMPLE 8

EXAMPLE 9

EXAMPLE 10

ZOOM LENS AND IMAGING APPARATUS

CROSS-REFERENCE TO RELATED APPLICATIONS

The present application claims priority under 35 U.S.C. § 119 to Japanese Patent Application No. 2018-154926, filed on Aug. 21, 2018. The above application is hereby expressly incorporated by reference, in its entirety, into the present application.

BACKGROUND OF THE INVENTION

1. Field of the Invention

The present invention relates to a zoom lens and an imaging apparatus.

2. Description of the Related Art

In the related art, a zoom lens having a five-group or six-group configuration has been used in a broadcast camera, a movie imaging camera, a digital camera, and the like. For example, JP2003-241096A and WO2014/115230A disclose zoom lenses of a type which can be used in the above-mentioned camera and in which a lens group having a positive refractive power is disposed to be closest to the object side and the entire length of the lens system is invariant during zooming.

SUMMARY OF THE INVENTION

There is a demand for the zoom lens used in the camera to be reduced in size and weight while having high resolution and to have a high magnification. The demand level is increasing year by year.

The lens system described in JP2003-241096A has a low magnification, and in order to increase the magnification, it is difficult to ensure the moving amount of the third lens group, which is a main zoom group, and thus it is difficult to increase the magnification. In order to sufficiently meet the recent demand for high magnification, it is necessary for the lens system described in WO2014/115230A to have a further high magnification. In the lens system described in WO2014/115230A, in order to increase the magnification while maintaining high performance, it is difficult to suppress field curvature in the entire zoom range. In addition, since the first lens group and the second lens group are excessively separated on the telephoto side, it is difficult to suitably suppress fluctuation in spherical aberration on the telephoto side. As a result, it is difficult to increase the magnification.

The present invention has been made in view of the above circumstances. According to an embodiment of the present invention, it is an object to provide a zoom lens, which has high performance by achieving reduction in size and weight while achieving high resolution and high magnification, and an imaging apparatus comprising the zoom lens.

The specific means for achieving the object includes the following aspects.

According to a first aspect, a zoom lens consists of, in order from an object side to an image side: a first lens group that remains stationary with respect to an image plane during zooming and has a positive refractive power; a second lens group that moves along an optical axis during zooming and has a negative refractive power; a third lens group that moves along the optical axis during zooming and has a negative refractive power; at least one lens group that moves along the optical axis during zooming; and a rear group that remains stationary with respect to the image plane during zooming, where all distances between the lens groups adjacent to each other change during zooming, where the second lens group consists of one negative lens, where a zoom position at which the second lens group is located to be closest to the image side during zooming is between a wide-angle end and a telephoto end, and where assuming that a distance on the optical axis between a lens surface closest to the image side in the first lens group and a lens surface closest to the object side in the second lens group at the telephoto end is Db12, and a focal length of the first lens group is f1, Conditional Expression (1) is satisfied, which is represented by $$0.004 < Db12/f1 < 0.8 \tag{1}.$$

According to a second aspect, in the zoom lens according to the first aspect, assuming that a lateral magnification of the second lens group at the telephoto end is β2t, Conditional Expression (2A) is satisfied, which is represented by $$0.1 < 1/\beta 2t < 1 \tag{2A}.$$

According to a third aspect, a zoom lens consists of, in order from an object side to an image side: a first lens group that remains stationary with respect to an image plane during zooming and has a positive refractive power; a second lens group that moves along an optical axis during zooming and has a negative refractive power; a third lens group that moves along the optical axis during zooming and has a negative refractive power; at least one lens group that moves along the optical axis during zooming; and a rear group that remains stationary with respect to the image plane during zooming, where all distances between the lens groups adjacent to each other change during zooming, where assuming that a distance on the optical axis between a lens surface closest to the image side in the first lens group and a lens surface closest to the object side in the second lens group at the telephoto end is Db12, a focal length of the first lens group is f1, and a lateral magnification of the second lens group at the telephoto end is β2t, Conditional Expressions (1) and (2B) are satisfied, which are represented by $$0.004 < Db12/f1 < 0.8 \tag{1}, \text{and}$$

$$0.62 < 1/\beta 2t < 1 \tag{2B}.$$

According to a fourth aspect, in any one of the zoom lenses according to the first to third aspects, assuming that a focal length of the second lens group is f2, and a focal length of the third lens group is f3, Conditional Expression (3) is satisfied, which is represented by $$0.001 < f3/f2 < 0.375 \tag{3}.$$

According to a fifth aspect, in any one of the zoom lenses according to the first to fourth aspects, assuming that a distance on the optical axis between the lens surface closest to the image side in the first lens group and a lens surface closest to the object side in the third lens group at the wide-angle end is Db13, and a difference in a direction of the optical axis between a position of the third lens group at the wide-angle end and a position of the third lens group at the telephoto end is D3wt, Conditional Expression (4) is satisfied, which is represented by $$0.01 < Db13/D3wt < 0.12 \tag{4}.$$

According to a sixth aspect, in any one of the zoom lenses according to the first to fifth aspects, assuming that a focal length of the first lens group is f1, and a focal length of the second lens group is f2, Conditional Expression (5) is satisfied, which is represented by $$-0.4 < f1/f2 < -0.01 \quad (5).$$

According to a seventh aspect, in any one of the zoom lenses according to the first to sixth aspects, assuming that an average value of refractive indexes of all lenses included in the second lens group based on a d line is Nave, and an average value of Abbe numbers of all the lenses included in the second lens group based on the d line is vave, Conditional Expression (6) is satisfied, which is represented by $$1.8 < Nave + 0.006 \times vave < 2.1 \quad (6).$$

According to an eighth aspect, in any one of the zoom lenses according to the first to seventh aspects, assuming that a focal length of the zoom lens at the telephoto end is ft, and a focal length of the first lens group is f1, Conditional Expression (7) is satisfied, which is represented by $$1 < ft/f1 < 5 \quad (7).$$

According to a ninth aspect, in any one of the zoom lenses according to the first to eighth aspects, assuming that a lateral magnification of the rear group is βr, Conditional Expression (8) is satisfied, which is represented by $$-5 < \beta r < -1 \quad (8).$$

According to a tenth aspect, in any one of the zoom lenses according to the first to ninth aspects, assuming that a combined lateral magnification of the third lens group, the at least one lens group, and the rear group at the wide-angle end is β3rw, and a combined lateral magnification of the third lens group, the at least one lens group, and the rear group at the telephoto end is β3rt, Conditional Expression (9) is satisfied, which is represented by $$5 < \beta 3rt/\beta 3rw < 150 \quad (9).$$

According to an eleventh aspect, in any one of the zoom lenses according to the first to tenth aspects, the third lens group moves constantly from the object side to the image side during zooming from the wide-angle end to the telephoto end.

According to a twelfth aspect, in any one of the zoom lenses according to the first to eleventh aspects, the lens group disposed to be adjacent to the object side in the rear group has a negative refractive power.

According to a thirteenth aspect, in any one of the zoom lenses according to the first to twelfth aspects, the rear group includes a vibration reduction group that performs image blur correction by moving in a direction intersecting the optical axis.

According to a fourteenth aspect, in any one of the zoom lenses according to the first to thirteenth aspects, Conditional Expression (1-1) is satisfied, which is represented by $$0.005 < Db12/f1 < 0.55 \quad (1-1).$$

According to a fifteenth aspect, in any one of the zoom lenses according to the second aspect, Conditional Expression (2A-1) is satisfied, which is represented by $$0.52 < 1/\beta 2t < 0.99 \quad (2A-1).$$

According to a sixteenth aspect, in any one of the zoom lenses according to the third aspect, Conditional Expression (2B-1) is satisfied, which is represented by $$0.66 < 1/\beta 2t < 0.99 \quad (2B-1).$$

According to a seventeenth aspect, in any one of the zoom lenses according to the fourth aspect, Conditional Expression (3-1) is satisfied, which is represented by $$0.005 < f3/f2 < 0.24 \quad (3-1).$$

According to an eighteenth aspect, in any one of the zoom lenses according to the fifth aspect, Conditional Expression (4-1) is satisfied, which is represented by $$0.02 < Db13/D3wt < 0.085 \quad (4-1).$$

According to a nineteenth aspect, any one of the zoom lenses according to the first to eighteenth aspects further consists of five or six lens groups in which a distance between lens groups adjacent to each other changes during zooming.

According to a twentieth aspect, an imaging apparatus comprises any one of the zoom lenses according to the first to nineteenth aspects.

It should be noted that "at least one lens group that moves along the optical axis during zooming" in the zoom lenses according to the first and third aspects is a lens group different from both the "second lens group" and the "third lens group".

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The "lens group" is not limited to a configuration using a plurality of lenses, but may consist of only one lens. Further, regarding the "one lens group", a lens group in which the distance in the direction of the optical axis between the groups adjacent to each other changes during zooming is regarded as "one lens group". That is, in a case where the lens group is divided at distances changing during zooming, the lens group included in one division is regarded as one lens group.

A compound aspheric lens (a lens which is integrally composed of a spherical lens and a film having an aspheric shape formed on the spherical lens, and functions as one aspheric lens as a whole) is not be considered as a cemented lens, and is treated as a single lens. The sign of the refractive power and the surface shape of the lens surface of a lens including an aspheric surface are considered in terms of the paraxial region unless otherwise noted.

The "focal length" and the "lateral magnification" in conditional expressions use values in the paraxial region. All the values of conditional expressions are values in a case where the d line is used as a reference in a state in which the object at infinity is in focus. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers). The partial dispersion ratio θgF between the g line and the F line of a certain lens is defined by θgF=(Ng−NF)/(NF−NC), where Ng, NF, and NC are the refractive indices of the lens at the g line, the F line, and the C line.

According to an embodiment of the present invention, it is possible to provide a zoom lens, which has high performance by achieving reduction in size and weight while achieving high resolution and high magnification, and an imaging apparatus comprising the zoom lens.

DESCRIPTION OF THE PREFERRED EMBODIMENTS

Figure 1:
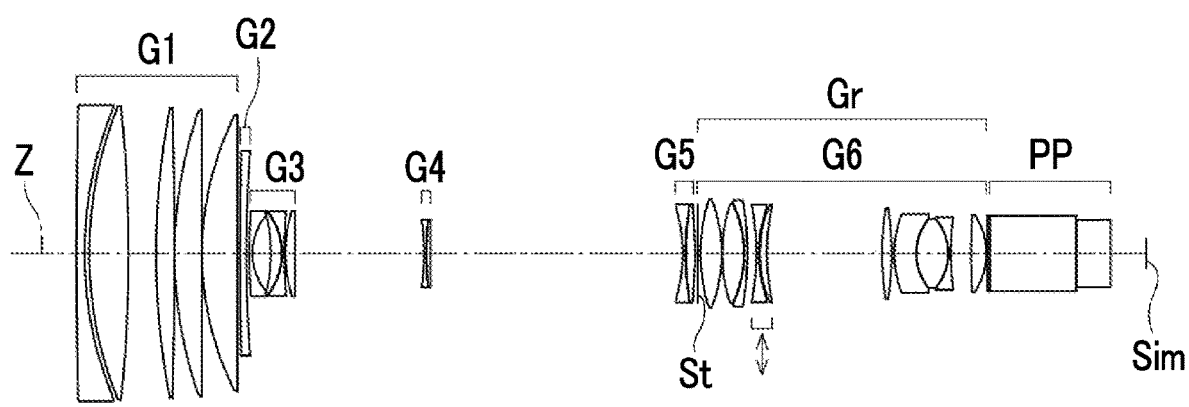
FIG. 1 is a diagram illustrating a movement locus and a cross-sectional view of the configuration of the zoom lenses according to the first and second embodiments of the present invention, corresponding to a zoom lens according to Example 1 of the present invention.
Figure 1:
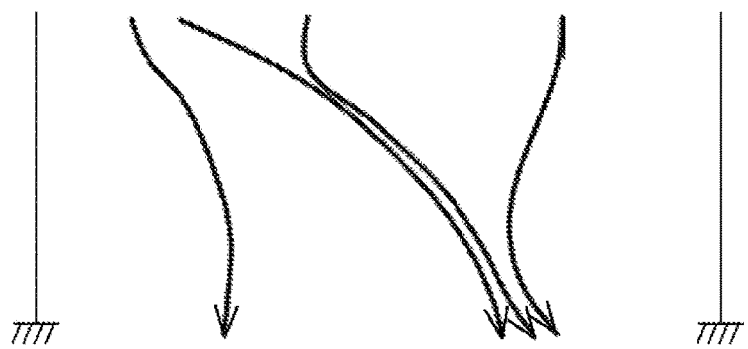
Figure 1:
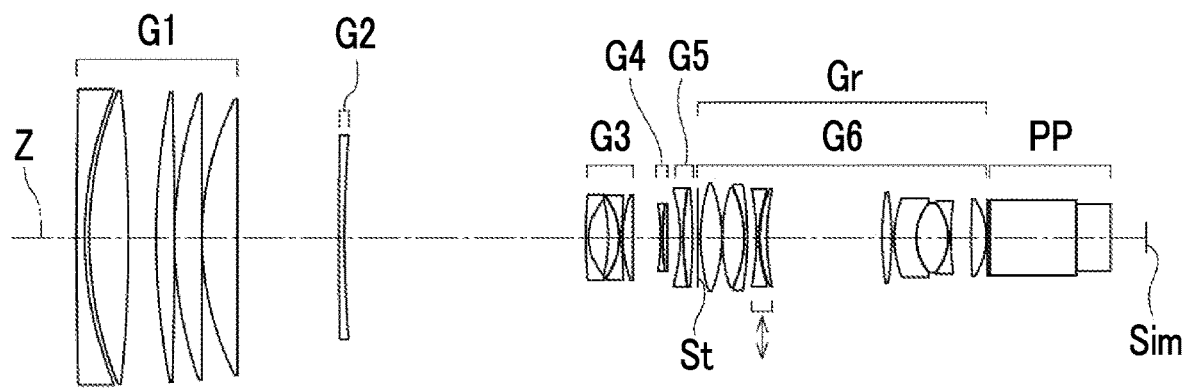

Hereinafter, embodiments of the zoom lens of the present invention will be described in detail with reference to the drawings. FIG. 1 is a cross-sectional view illustrating a configuration of a zoom lens according to a first embodiment of the present invention. The example shown in FIG. 1 corresponds to the zoom lens of Example 1 to be described later. In FIG. 1, aberrations at the wide-angle end state are shown in the upper part indicated by "WIDE", and aberrations at the telephoto end state are shown in the lower part indicated by "TELE". In FIG. 1, the left side is the object side, the right side is the image side, and a state in which an object at infinity is in focus is shown.

Further, FIG. 1 shows an example in which, assuming that a zoom lens is applied to an imaging apparatus, an optical member PP of which the incident surface and the exit surface are parallel is disposed between the zoom lens and the image plane Sim. The optical member PP is a member assumed to include various filters, a prism, a cover glass, and/or the like. The various filters include, for example, a low pass filter, an infrared cut filter, and a filter that cuts a specific wavelength region. The optical member PP has no refractive power, and the optical member PP may be configured to be omitted.

The zoom lens according to the first embodiment of the present invention consists of, in order from the object side to the image side along an optical axis Z: a first lens group G1 that remains stationary with respect to an image plane Sim during zooming and has a positive refractive power; a second lens group G2 that moves along an optical axis Z during zooming and has a negative refractive power; a third lens group G3 that moves along the optical axis Z during zooming and has a negative refractive power; at least one lens group that moves along the optical axis Z during zooming; and a rear group Gr that remains stationary with respect to the image plane Sim during zooming. All distances between the lens groups adjacent to each other change during zooming.

The zoom lens of the example shown in FIG. 1 consists of, in order from the object side to the image side, the first lens group G1, the second lens group G2, the third lens group G3, a fourth lens group G4, a fifth lens group G5, and a sixth lens group G6. The aperture stop St is disposed to be closest to the object side in the sixth lens group G6. Further, the aperture stop St shown in FIG. 1 does not show its shape but shows its position in the direction of the optical axis. In the example shown in FIG. 1, the sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the optical axis direction by changing the distance between lens groups adjacent to each other. In FIG. 1, the movement locus of each lens group during zooming from the wide-angle end to the telephoto end is schematically indicated by an arrow under each lens group which moves during zooming, and a symbol which indicates the bottom is shown under each lens group remaining stationary with respect to the surface Sim during zooming.

In the example of FIG. 1, the first lens group G1 consists of five lenses, the second lens group G2 consists of one lens, the third lens group G3 consists of four lenses, the fourth lens group G4 consists of two lenses, the fifth lens group G5 consists of two lenses, and the sixth lens group G6 consists of an aperture stop St and ten lenses. However, in the zoom lens of the present invention, the number of lens groups constituting the zoom lens, the number of lenses constituting each lens group, and the position of the aperture stop St may be set to be different from those in the example shown in FIG. 1.

By forming the first lens group G1 closest to the object side as a lens group having a positive refractive power, the total length of the lens system can be shortened. As a result, there is an advantage in achieving reduction in size.

By moving the second lens group G2 as a lens group having a negative refractive power during zooming, it is possible to correct field curvature in a range from the wide-angle end to the middle zoom position and spherical aberration in a range from the middle zoom position to the telephoto end. Thereby, it is possible to suppress fluctuation in field curvature from the wide-angle end to the middle zoom position and fluctuation in spherical aberration from the middle zoom position to the telephoto end.

By forming the third lens group G3 as a lens group having a negative refractive power, the third lens group G3 can be set as a main zoom group having a main zoom function.

Since at least one lens group moving along the optical axis Z during zooming is disposed on the image side of the third lens group G3, it is possible to suppress fluctuation in image position during zooming, and it is possible to suppress fluctuation in field curvature during zooming.

The rear group Gr closest to the image is able to have an imaging function. By adopting a configuration in which the first lens group G1 closest to the object side and the rear group Gr closest to the image side remain stationary with respect to the image plane Sim during zooming, the total length of the lens system can be set to be invariable during zooming.

In the zoom lens of the first embodiment, the second lens group G2 consists of one negative lens. By setting the number of lenses constituting the second lens group G2 to one, a large movable space for the third lens group G3 which is the main zoom group can be ensured. As a result, there is an advantage in achieving high magnification.

Further, in the zoom lens of the first embodiment, a zoom position at which the second lens group G2 is located to be closest to the image side during zooming is configured to be not at the telephoto end nor at the wide-angle end but between a wide-angle end and a telephoto end. During zooming toward the telephoto end, by making the second lens group G2 closer to the first lens group G1, spherical aberration generated in the first lens group G1 can be corrected. During zooming toward the wide-angle end, field curvature can be suppressed. As a result, there is an advantage in achieving high magnification.

Figure 2:
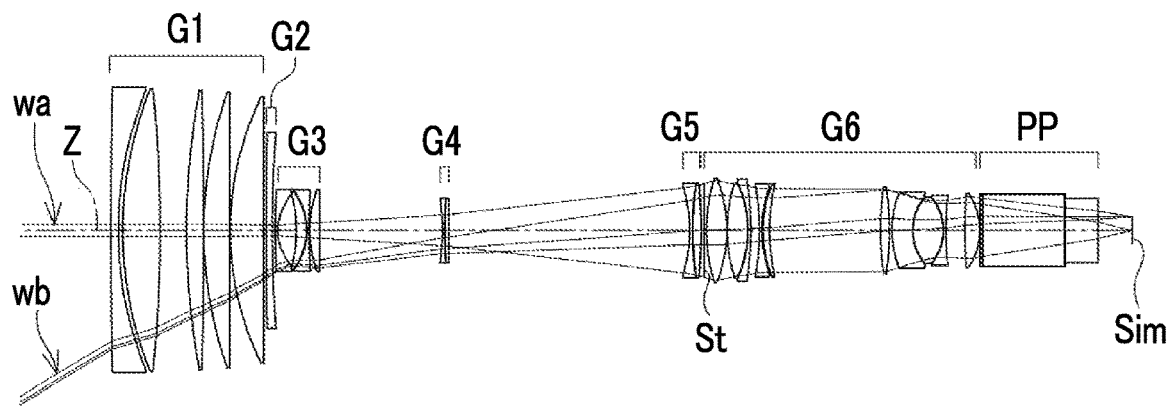
FIG. 2 is a cross-sectional view illustrating a configuration of the zoom lens and rays shown in FIG. 1.
Figure 2:
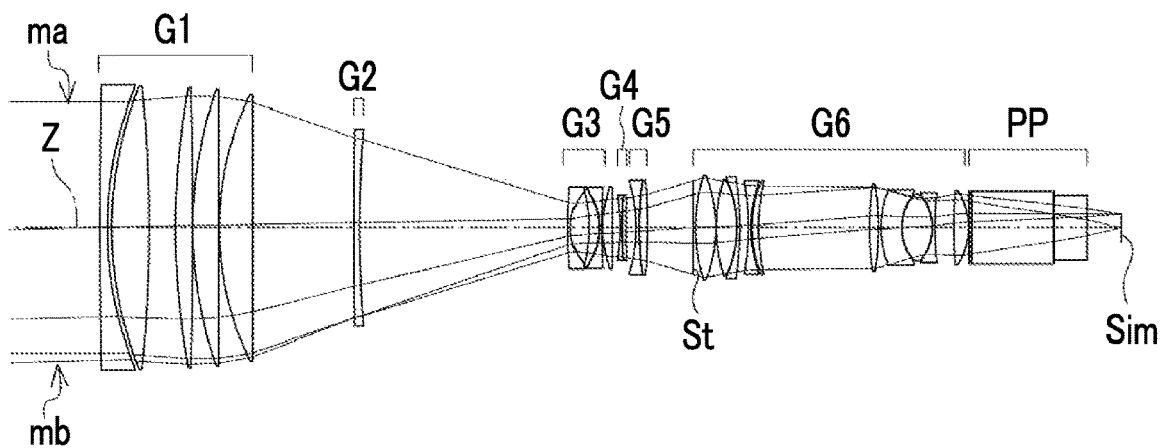
Figure 2:
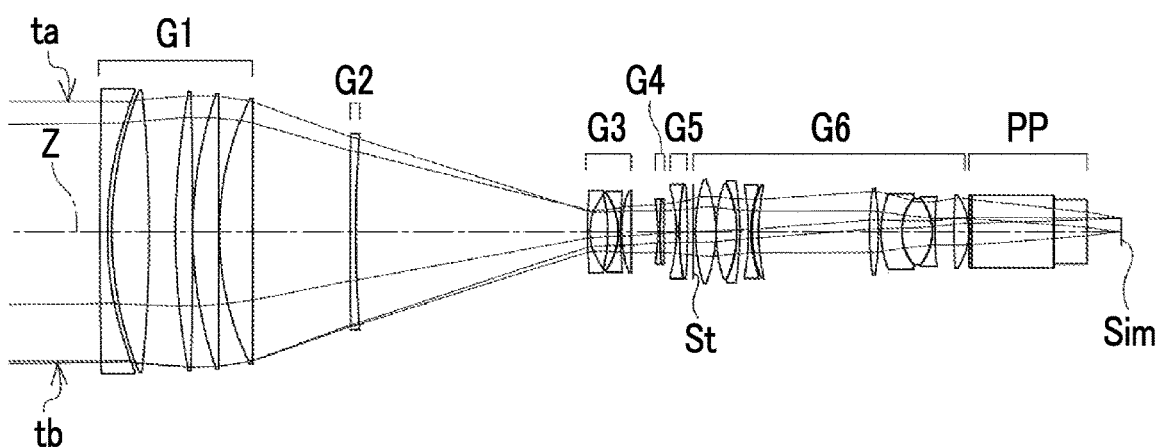

FIG. 2 is a cross-sectional view illustrating configurations of the zoom lens shown in FIG. 1 in the respective states. In FIG. 2, the upper part labeled "WIDE" indicates the wide-angle end state, the middle part labeled "MIDDLE" indicates the zoom position state where the second lens group G2 is located to be closest to the image side, and the lower part labeled "TELE" indicates the telephoto end state. FIG. 2 collectively shows on-axis rays wa and rays with the maximum angle of view wb in the wide-angle end state, on-axis rays ma and rays with the maximum angle of view mb in the zoom position state in which the second lens group G2 is located to be closest to the image side, and on-axis rays ta and rays with the maximum angle of view tb in the telephoto end state.

Further, in the zoom lens of the first embodiment, assuming that a distance on the optical axis Z between the lens surface closest to the image side in the first lens group G1 and the lens surface closest to the object side in the second lens group G2 at the telephoto end is Db12, and a focal length of the first lens group G1 is f1, Conditional Expression (1) is satisfied. By not allowing the result of Conditional Expression (1) to be equal to or less than the lower limit, the amount of movement of the second lens group G2 from the wide-angle end to the telephoto end can be prevented from becoming excessively small. As a result, it becomes easy to suppress fluctuation in field curvature on the wide-angle side and fluctuation in spherical aberration on the telephoto side in a well-balanced manner. Further, it is possible to prevent the refractive power of the first lens group G1 from becoming excessively weak. As a result, there is an advantage in achieving reduction in size and weight of the lens system. Furthermore, interference between the first lens group G1 and the second lens group G2 can be prevented from occurring. By not allowing the result of Conditional Expression (1) to be equal to or greater than the upper limit, the distance between the first lens group G1 and the second lens group G2 can be prevented from becoming excessively large. Therefore, even in a case where the magnification is increased, the effect of suppressing fluctuation in spherical aberration on the telephoto side can be ensured. Further, it is possible to prevent the refractive power of the first lens group G1 from becoming excessively strong, and it is possible to suppress spherical aberration generated in the first lens group G1. In addition, in a case of a configuration in which Conditional Expression (1-1) is satisfied, it is possible to obtain more favorable characteristics. In a case of a configuration in which Conditional Expression (1-2) is satisfied, it is possible to obtain further more favorable characteristics.

$$0.004 < Db12/f1 < 0.8 \tag{1}$$

$$0.005 < Db12/f1 < 0.55 \tag{1-1}$$

$$0.006 < Db12/f1 < 0.32 \tag{1-2}$$

In the zoom lens according to the first embodiment, assuming that a lateral magnification of the second lens group G2 at the telephoto end is $\beta 2t$, Conditional Expression (2A) is satisfied. By not allowing the result of Conditional Expression (2A) to be equal to or less than the lower limit, it is possible to prevent lateral magnification of the second lens group G2 at the telephoto end from becoming excessively large, and it is possible to prevent the composite focal length of the first lens group G1 and the second lens group G2 at the telephoto end from becoming excessively long. Thereby, it becomes easy to ensure the negative refractive power of the third lens group G3, and it becomes easy to minimize the zoom stroke of the third lens group G3 which is the main zoom group in a case of achieving high magnification. As a result, there is an advantage in achieving both high magnification and reduction in size. By not allowing the result of Conditional Expression (2A) to be equal to or greater than the upper limit, it is possible to prevent the negative refractive power of the second lens group G2 from becoming excessively weak, and it is possible to ensure the aberration correction effect of the negative lens of the second lens group G2. In addition, in a case of a configuration in which Conditional Expression (2A-1) is satisfied, it is possible to obtain more favorable characteristics. In a case of a configuration in which Conditional Expression (2A-2) is satisfied, it is possible to obtain further more favorable characteristics.

$$0.1 < 1/\beta 2t < 1 \quad (2A)$$

$$0.52 < 1/\beta 2t < 0.99 \quad (2A\text{-}1)$$

$$0.7 < 1/\beta 2t < 0.98 \quad (2A\text{-}2)$$

Next, the zoom lens according to the second embodiment of the present invention will be described. The zoom lens according to the second embodiment of the present invention and the zoom lens according to the first embodiment of the present invention have partially the same configuration. A cross-sectional view illustrating the configuration of the zoom lens according to the second embodiment of the present invention is the same as that shown in FIG. 1.

The zoom lens according to the second embodiment of the present invention consists of, in order from the object side to the image side along the optical axis Z: a first lens group G1 that remains stationary with respect to an image plane Sim during zooming and has a positive refractive power; a second lens group G2 that moves along an optical axis Z during zooming and has a negative refractive power; a third lens group G3 that moves along the optical axis Z during zooming and has a negative refractive power; at least one lens group that moves along the optical axis Z during zooming; and a rear group Gr that remains stationary with respect to the image plane Sim during zooming. All distances between the lens groups adjacent to each other change during zooming. Further, in the zoom lens according to the second embodiment of the present invention, assuming that a distance on the optical axis between the lens surface closest to the image side in the first lens group G1 and the lens surface closest to the object side in the second lens group G2 at the telephoto end is Db12, and a focal length of the first lens group G1 is f1, Conditional Expression (1) is satisfied.

$$0.004 < Db12/f1 < 0.8 \quad (1)$$

The configuration of the zoom lens according to the second embodiment is the same as the configuration of the zoom lens according to the first embodiment, and the function and effect of each configuration are the same as those in the description of the zoom lens according to the first embodiment. Thus, the description will not be repeated. In addition, in the second embodiment, in a case of a configuration in which Conditional Expression (1-1) is satisfied, it is possible to obtain more favorable characteristics. In a case of a configuration in which Conditional Expression (1-2) is satisfied, it is possible to obtain further more favorable characteristics.

Furthermore, in the zoom lens according to the second embodiment of the present invention, assuming that a lateral magnification of the second lens group G2 at the telephoto end is β2t, Conditional Expressions (1) and (2B) are satisfied. By not allowing the result of Conditional Expression (2B) to be equal to or less than the lower limit, it is possible to suppress lateral magnification of the second lens group G2 at the telephoto end, and it becomes easy to prevent the composite focal length of the first lens group G1 and the second lens group G2 at the telephoto end from becoming excessively long. By not allowing the result of Conditional Expression (2B) to be equal to or less than the lower limit, it is possible to further minimize the zoom stroke of the third lens group G3 as a main zoom group in a case of achieving high magnification as compared with the case where Conditional Expression (2A) is not allowed to be equal to or less than the lower limit. As a result, the configuration is more advantageous in achieving both high magnification and reduction in size. By not allowing the result of Conditional Expression (2B) to be equal to or greater than the upper limit, it is possible to prevent the negative refractive power of the second lens group G2 from becoming excessively weak, and it is possible to ensure the aberration correction effect of the negative lens of the second lens group G2. In addition, in a case of a configuration in which Conditional Expression (2B-1) is satisfied, it is possible to obtain more favorable characteristics. In a case of a configuration in which Conditional Expression (2B-2) is satisfied, it is possible to obtain further more favorable characteristics.

$$0.62 < 1/\beta 2t < 1 \quad (2B)$$

$$0.66 < 1/\beta 2t < 0.99 \quad (2B\text{-}1)$$

$$0.7 < 1/\beta 2t < 0.98 \quad (2B\text{-}2)$$

The zoom lens according to the first embodiment has a configuration where the second lens group G2 consists of a single negative lens, and has a configuration where the zoom position at which the second lens group G2 is located to be closest to the image side during zooming is a zoom position between the wide-angle end and the telephoto end. However, the zoom lens according to the second embodiment does not have to have these configurations. However, the zoom lens according to the second embodiment has the same configuration as the zoom lens according to the first embodiment, and a configuration in which β2t is in the range of Conditional Expression (2B). Thereby, there is an advantage in achieving both high magnification and reduction in size, and the zoom lens is able to have favorable performance.

The zoom lens according to the second embodiment may have the above configuration of the zoom lens according to the first embodiment. That is, the zoom lens according to the second embodiment may be configured such that the second lens group G2 consists of one negative lens. The zoom lens of the second embodiment may be configured such that the zoom position at which the second lens group G2 is located to be closest to the image side during zooming is the zoom position between the wide-angle end and the telephoto end. The functions and effects of these configurations are the same as those in the description of the zoom lens according to the first embodiment.

Hereinafter, preferable configurations and possible configurations of the zoom lens according to the first and second embodiments of the present invention will be described. Assuming that a focal length of the second lens group G2 is f2, and a focal length of the third lens group G3 is f3, it is preferable to satisfy Conditional Expression (3). By not allowing the result of Conditional Expression (3) to be equal to or less than the lower limit, the refractive power of the third lens group G3 can be suppressed, and fluctuation in spherical aberration during zooming can be suppressed. Further, by not allowing the result of Conditional Expression (3) to be equal to or less than the lower limit, it is possible to ensure the refractive power of the second lens group G2. As a result, it becomes easy to correct field curvature on the wide-angle side and spherical aberration on the telephoto side in a well-balanced manner. By not allowing the result of Conditional Expression (3) to be equal to or greater than the upper limit, it is possible to ensure the refractive power of the third lens group G3. As a result, there is an advantage in achieving high magnification and reduction in size. In addition, in a case of a configuration in which Conditional Expression (3-1) is satisfied, it is possible to obtain more favorable characteristics. In a case of a configuration in which Conditional Expression (3-2) is satisfied, it is possible to obtain further more favorable characteristics.

$$0.001 < f3/f2 < 0.375 \qquad (3)$$

$$0.005 < f3/f2 < 0.24 \qquad (3\text{-}1)$$

$$0.009 < f3/f2 < 0.12 \qquad (3\text{-}2)$$

Further, assuming that a distance on the optical axis Z between the lens surface closest to the image side in the first lens group G1 and the lens surface closest to the object side in the third lens group G3 at the wide-angle end is Db13, and a difference in the optical axis direction between a position of the third lens group G3 at the wide-angle end and a position of the third lens group G3 at the telephoto end is D3wt, it is preferable to satisfy Conditional Expression (4). By not allowing the result of Conditional Expression (4) to be equal to or less than the lower limit, the distance between the first lens group G1 and the third lens group G3 at the wide-angle end can be prevented from becoming excessively small, and it is possible to prevent the thickness of the lens of the second lens group G2 from becoming thin. Thereby, for example, it becomes possible to suppress the deformation of the lens at the time of temperature change, to improve the surface precision of the lens at the time of processing, and/or to suppress the deformation of the lens at the time of assembly. By not allowing the result of Conditional Expression (4) to be equal to or greater than the upper limit, the zoom stroke from the wide-angle end to the telephoto end of the third lens group G3 can be ensured. As a result, there is an advantage in achieving high magnification. In addition, in a case of a configuration in which Conditional Expression (4-1) is satisfied, it is possible to obtain more favorable characteristics. In a case of a configuration in which Conditional Expression (4-2) is satisfied, it is possible to obtain further more favorable characteristics.

$$0.01 < Db13/D3wt < 0.12 \qquad (4)$$

$$0.02 < Db13/D3wt < 0.085 \qquad (4\text{-}1)$$

$$0.028 < Db13/D3wt < 0.05 \qquad (4\text{-}2)$$

Assuming that a focal length of the first lens group G1 is f1, and a focal length of the second lens group G2 is f2, it is preferable to satisfy Conditional Expression (5). By not allowing the result of Conditional Expression (5) to be equal to or less than the lower limit, it is possible to prevent the refractive power of the second lens group G2 from becoming excessively strong, and it is possible to satisfactorily correct the field curvature of the peripheral portion of the imaging region on the wide-angle side. By not allowing the result of Conditional Expression (5) to be equal to or greater than the upper limit, the refractive power of the second lens group G2 can be prevented from being excessively weak, and it is possible to satisfactorily correct spherical aberration on the telephoto side. In addition, in a case of a configuration in which Conditional Expression (5-1) is satisfied, it is possible to obtain more favorable characteristics. In a case of a configuration in which Conditional Expression (5-2) is satisfied, it is possible to obtain further more favorable characteristics.

$$-0.4 < f1/f2 < -0.01 \qquad (5)$$

$$-0.38 < f1/f2 < -0.03 \qquad (5\text{-}1)$$

$$-0.35 < f1/f2 < -0.05 \qquad (5\text{-}2)$$

Assuming that an average value of refractive indexes of all lenses included in the second lens group G2 based on the d line is Nave, and an average value of Abbe numbers of all the lenses included in the second lens group G2 based on the d line is vave, Conditional Expression (6), it is preferable to satisfy Conditional Expression (6). In addition, in a case where the second lens group G2 consists of a single lens, the refractive index of this lens at the d line and the Abbe number based on the d line are Nave and vave, respectively. By not allowing the result of Conditional Expression (6) to be equal to or less than the lower limit, it is possible to satisfactorily correct the chromatic aberration on the telephoto side while achieving reduction in size and high magnification. By not allowing the result of Conditional Expression (6) to be equal to or greater than the upper limit, it is possible to prevent the lens of the second lens group G2 from having excessively low dispersion and excessively high refractive index. In the zoom lens of the present invention, by moving the second lens group G2 during zooming, it is possible to correct aberrations such as field curvature and spherical aberration which fluctuate during zooming. At this time, the aberrations are not corrected by the second lens group G2 alone, but the aberrations are caused to remain in the second lens group G2 alone. Thus, it is effective to adopt a configuration in which aberrations of the second lens group G2 cancel out aberrations which fluctuate during zooming. By not allowing the result of Conditional Expression (6) to be equal to or greater than the upper limit, aberrations are caused to appropriately remain in the second lens group G2 alone, and the aberration correction effect of the second lens group can be ensured. In addition, in a case of a configuration in which Conditional Expression (6-1) is satisfied, it is possible to obtain more favorable characteristics. In a case of a configuration in which Conditional Expression (6-2) is satisfied, it is possible to obtain further more favorable characteristics.

$$1.8 < Nave + 0.006 \times vave < 2.1 \qquad (6)$$

$$1.88 < Nave + 0.006 \times vave < 2.05 \qquad (6\text{-}1)$$

$$1.96 < Nave + 0.006 \times vave < 2.03 \qquad (6\text{-}2)$$

Assuming that a focal length of the zoom lens at the telephoto end is ft, and a focal length of the first lens group G1 is f1, it is preferable to satisfy Conditional Expression (7). By not allowing the result of Conditional Expression (7) to be equal to or less than the lower limit, it is possible to prevent the refractive power of the first lens group G1 from becoming excessively weak. As a result, there is an advantage in achieving reduction in size and weight of the lens system. By not allowing the result of Conditional Expression (7) to be equal to or greater than the upper limit, it is possible to prevent the refractive power of the first lens group G1 from becoming excessively strong, and it is possible to reduce the incident angle of the on-axis rays incident into the third lens group G3 which is the main zoom group from the object side. As a result, occurrence of spherical aberration can be suppressed. In addition, in a case of a configuration in which Conditional Expression (7-1) is satisfied, it is possible to obtain more favorable characteristics. In a case of a configuration in which Conditional Expression (7-2) is satisfied, it is possible to obtain further more favorable characteristics.

$$1 < ft/f1 < 5 \qquad (7)$$

$$1.7 < ft/f1 < 4.2 \qquad (7\text{-}1)$$

$$2.4 < ft/f1 < 3.4 \qquad (7\text{-}2)$$

Assuming that a lateral magnification of the rear group Gr is βr, it is preferable to satisfy Conditional Expression (8). By not allowing the result of Conditional Expression (8) to be equal to or less than the lower limit, it is possible to prevent aberrations from becoming large, and to suppress fluctuation in various aberrations during zooming. In a case where βr is greater than the upper limit of Conditional Expression (8) and βr is negative, βr is a reduction ratio, and the size of the image of the rear group Gr is smaller than the size of the object of the rear group Gr. By not allowing the result of Conditional Expression (8) to be equal to or greater than the upper limit, there is an advantage in achieving high magnification while suppressing enlargement of the entire lens system. In addition, in a case of a configuration in which Conditional Expression (8-1) is satisfied, it is possible to obtain more favorable characteristics. In a case of a configuration in which Conditional Expression (8-2) is satisfied, it is possible to obtain further more favorable characteristics.

$$-5 < \beta r < -1 \quad (8)$$

$$-3.6 < \beta r < -1 \quad (8\text{-}1)$$

$$-2.2 < \beta r < -1 \quad (8\text{-}2)$$

Assuming that a combined lateral magnification of the third lens group G3, the at least one lens group, and the rear group Gr at the wide-angle end is β3rw, and a combined lateral magnification of the third lens group G3, the at least one lens group, and the rear group Gr at the telephoto end is β3rt, it is preferable to satisfy Conditional Expression (9). By not allowing the result of Conditional Expression (9) to be equal to or less than the lower limit, fluctuation in lateral magnifications of the third lens group G3 and the subsequent lens groups can be prevented from becoming excessively small. As a result, there is an advantage in achieving high magnification. By not allowing the result of Conditional Expression (9) to be equal to or greater than the upper limit, it is possible to prevent fluctuation in lateral magnifications of the third lens group G3 and subsequent lens groups from becoming excessively large, and it is possible to satisfactorily suppress fluctuation in spherical aberration during zooming. In addition, in a case of a configuration in which Conditional Expression (9-1) is satisfied, it is possible to obtain more favorable characteristics. In a case of a configuration in which Conditional Expression (9-2) is satisfied, it is possible to obtain further more favorable characteristics.

$$5 < \beta 3rt / \beta 3rw < 150 \quad (9)$$

$$21 < \beta 3rt / \beta 3rw < 105 \quad (9\text{-}1)$$

$$37 < \beta 3rt / \beta 3rw < 60 \quad (9\text{-}2)$$

It is preferable that the third lens group G3 moves constantly from the object side to the image side during zooming from the wide-angle end to the telephoto end. In such a case, the zooming effect obtained by the third lens group G3 can be ensured even on the telephoto side, and reduction in magnification on the telephoto side can be suppressed.

Further, it is preferable that the lens group disposed to be adjacent to the object side in the rear group Gr has a negative refractive power. In such a case, the lens group disposed to be adjacent to the object side in the rear group Gr is able to move to the image side on the telephoto side in a case of correcting fluctuation in the image position during zooming. Therefore, it becomes easy to ensure the zoom stroke of the third lens group G3. As a result, there is an advantage in achieving reduction in size and high magnification.

In addition, it is preferable that the rear group Gr includes a vibration reduction group that performs image blur correction by moving in a direction intersecting the optical axis Z. Since the rear group Gr remains stationary with respect to the image plane Sim during zooming, the optical path of the principal ray in the rear group Gr is unchanged even during zooming. Since the rear group Gr includes the anti-vibration group, it is possible to ensure favorable performance at the time of image blur correction over the entire zoom range. In the example shown in FIG. 1, the rear group Gr consists of an aperture stop St and ten lenses, and the fourth lens and the fifth lens from the object side in the rear group Gr constitute a vibration reduction group. In FIG. 1, a bracket and a vertical double arrow are shown under each lens corresponding to the vibration reduction group.

The zoom lens can be configured to consist of five or six lens groups in which the distance between lens groups adjacent to each other in the direction of the optical axis changes during zooming. In such a case, it becomes easy to realize a high resolution and high magnification lens system while achieving reduction in size.

The above-mentioned preferred configurations and available configurations may be optional combinations, and it is preferable to selectively adopt the configurations in accordance with a required specification. According to the technology of the present invention, it is possible to realize a zoom lens that has high performance and high resolution while achieving reduction in size and weight while achieving high resolution. It should be noted that the term "high magnification" described herein means 20 times or more.

Next, numerical examples of the zoom lens of the present invention will be described.

Example 1

FIG. 1 is a cross-sectional view of a zoom lens of Example 1, and an illustration method and a configuration thereof is as described above. Therefore, repeated description is partially omitted herein. The zoom lens of Example 1 consists of, in order from the object side to the image side, a first lens group G1 having a positive refractive power; a second lens group G2 having a negative refractive power; a third lens group G3 having a negative refractive power; a fourth lens group G4 having a negative refractive power; a fifth lens group G5 having a negative refractive power; and a sixth lens group G6 having a positive refractive power. The sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the direction of the optical axis by changing the distance between lens groups adjacent to each other. The vibration reduction group consists of a fourth lens and a fifth lens from the object side in the sixth lens group G6.

Tables 1A and 1B show basic lens data of the zoom lens of Example 1, Table 2 shows values of specification and variable surface distances, and Table 3 shows aspheric surface coefficients thereof. Tables 1A and 1B show the basic lens data which is divided into two tables in order to prevent one table from becoming long. In Tables 1A and 1B, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of vd shows an Abbe number of each constituent element at the d line, and the column of θgF shows a partial dispersion ratio of each constituent element between the g line and the F line.

In Tables 1A and 1B, the sign of the radius of curvature of the surface convex toward the object side is positive and the sign of the radius of curvature of the surface convex toward the image side is negative. Table 1B also shows the aperture stop St and the optical member PP, and in a place of a surface number of a surface corresponding to the aperture stop St, the surface number and a term of (St) are noted. A value at the bottom place of D in Table 1B indicates a distance between the image plane Sim and the surface closest to the image side in the table. In Tables 1A and 1B, the variable surface distances are referenced by the reference signs DD[ ], and are written into places of D, where object side surface numbers of distances are noted in[ ].

In the range of Table 2, values of the zoom ratio Zr, the focal length f, the F number FNo, the maximum total angle of view 2ω, and the variable surface distance are based on the d line.)(° in the place of 2ω indicates that the unit thereof is a degree. In Table 2, the values in the wide-angle end state, the values in the zoom position state in which the second lens group G2 is positioned to be closest to the image side, and the values in the telephoto end state are respectively shown in the columns denoted as WIDE, MIDDLE, and TELE.

In Table 1B, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m is an integer of 3 or more) shows numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | vd | θgF |
|---|---|---|---|---|---|
| 1 | 2758.42359 | 2.980 | 1.80400 | 46.53 | 0.55775 |
| 2 | 152.67265 | 1.787 | | | |
| 3 | 155.78881 | 15.000 | 1.43387 | 95.18 | 0.53733 |
| 4 | −579.43924 | 10.554 | | | |
| 5 | 311.40157 | 6.877 | 1.43700 | 95.10 | 0.53364 |
| 6 | −2543.96177 | 0.120 | | | |
| 7 | 172.37716 | 10.400 | 1.43387 | 95.18 | 0.53733 |
| 8 | ∞ | 0.120 | | | |
| 9 | 123.68284 | 13.410 | 1.43387 | 95.18 | 0.53733 |
| 10 | ∞ | DD[10] | | | |
| 11 | 2719.51051 | 2.270 | 1.55032 | 75.50 | 0.54001 |
| 12 | 526.89880 | DD[12] | | | |
| 13 | 242.77714 | 1.050 | 2.00100 | 29.13 | 0.59952 |
| 14 | 23.20915 | 7.158 | | | |
| 15 | −62.97480 | 4.200 | 1.89286 | 20.36 | 0.63944 |
| 16 | −27.16300 | 1.010 | 1.89190 | 37.13 | 0.57813 |
| 17 | 262.01725 | 0.300 | | | |
| 18 | 50.90026 | 3.904 | 1.92286 | 20.88 | 0.63900 |
| 19 | −1873.94860 | DD[19] | | | |
| 20 | −88.84343 | 0.910 | 1.76385 | 48.49 | 0.55898 |
| 21 | 157.11400 | 1.600 | 1.92286 | 20.88 | 0.63900 |
| 22 | 1415.06905 | DD[22] | | | |
| 23 | −64.30288 | 1.180 | 1.90043 | 37.37 | 0.57668 |
| 24 | 124.49000 | 3.410 | 1.89286 | 20.36 | 0.63944 |
| 25 | −223.30610 | DD[25] | | | |

TABLE 1B

Example 1

| Sn | R | D | Nd | vd | θgF |
|---|---|---|---|---|---|
| 26 (St) | ∞ | 1.000 | | | |
| 27 | 73.95141 | 8.154 | 1.76385 | 48.49 | 0.55898 |
| *28 | −55.93924 | 0.171 | | | |
| 29 | 65.49849 | 8.290 | 1.43875 | 94.66 | 0.53402 |
| 30 | −47.73600 | 1.240 | 1.95906 | 17.47 | 0.65993 |
| 31 | −128.25888 | 3.375 | | | |
| *32 | −100.54918 | 1.000 | 1.80610 | 40.93 | 0.57019 |
| 33 | 53.98672 | 0.399 | | | |
| 34 | 49.88468 | 2.736 | 1.95906 | 17.47 | 0.65993 |
| 35 | 89.66151 | 44.161 | | | |
| 36 | 118.02446 | 3.680 | 1.85478 | 24.80 | 0.61232 |
| 37 | −118.02446 | 1.019 | | | |
| 38 | 41.73080 | 8.310 | 2.00100 | 29.13 | 0.59952 |
| 39 | 21.41900 | 12.300 | 1.48749 | 70.24 | 0.53007 |
| 40 | −21.41900 | 0.980 | 1.91082 | 35.25 | 0.58224 |
| 41 | 116.06433 | 7.692 | | | |
| 42 | 269.35684 | 5.898 | 1.56883 | 56.04 | 0.54853 |
| 43 | −27.85993 | 0.200 | | | |
| 44 | ∞ | 1.000 | 1.51633 | 64.14 | 0.53531 |
| 45 | ∞ | 33.000 | 1.60859 | 46.44 | 0.56664 |
| 46 | ∞ | 13.200 | 1.51633 | 64.05 | 0.53463 |
| 47 | ∞ | 13.497 | | | |

TABLE 2

Example 1

| | WIDE | MIDDLE | TELE |
|---|---|---|---|
| Zr | 1.0 | 21.8 | 44.3 |
| f | 9.603 | 209.632 | 425.817 |
| FNo. | 2.06 | 2.06 | 4.04 |
| 2ω (°) | 63.4 | 3.0 | 1.4 |
| DD[10] | 1.200 | 40.508 | 38.966 |
| DD[12] | 1.200 | 83.200 | 92.346 |
| DD[19] | 49.285 | 3.000 | 10.563 |
| DD[22] | 96.090 | 4.015 | 5.023 |
| DD[25] | 1.198 | 18.251 | 2.075 |

TABLE 3

Example 1

| | Sn | |
|---|---|---|
| | 28 | 32 |
| KA | 1.0000000E+00 | 1.0000000E+00 |
| A4 | 1.2726760E−06 | 4.7415505E−07 |
| A6 | 3.6654463E−09 | 6.5877762E−09 |
| A8 | −3.2814800E−11 | −6.9216211E−11 |
| A10 | 1.9124227E−13 | 4.3338142E−13 |
| A12 | −8.0478127E−16 | −1.9572115E−15 |
| A14 | 2.3664959E−18 | 6.5784048E−18 |
| A16 | −4.5218264E−21 | −1.5503257E−20 |
| A18 | 4.9870538E−24 | 2.2423809E−23 |
| A20 | −2.3905900E−27 | −1.4628348E−26 |

Figure 12:
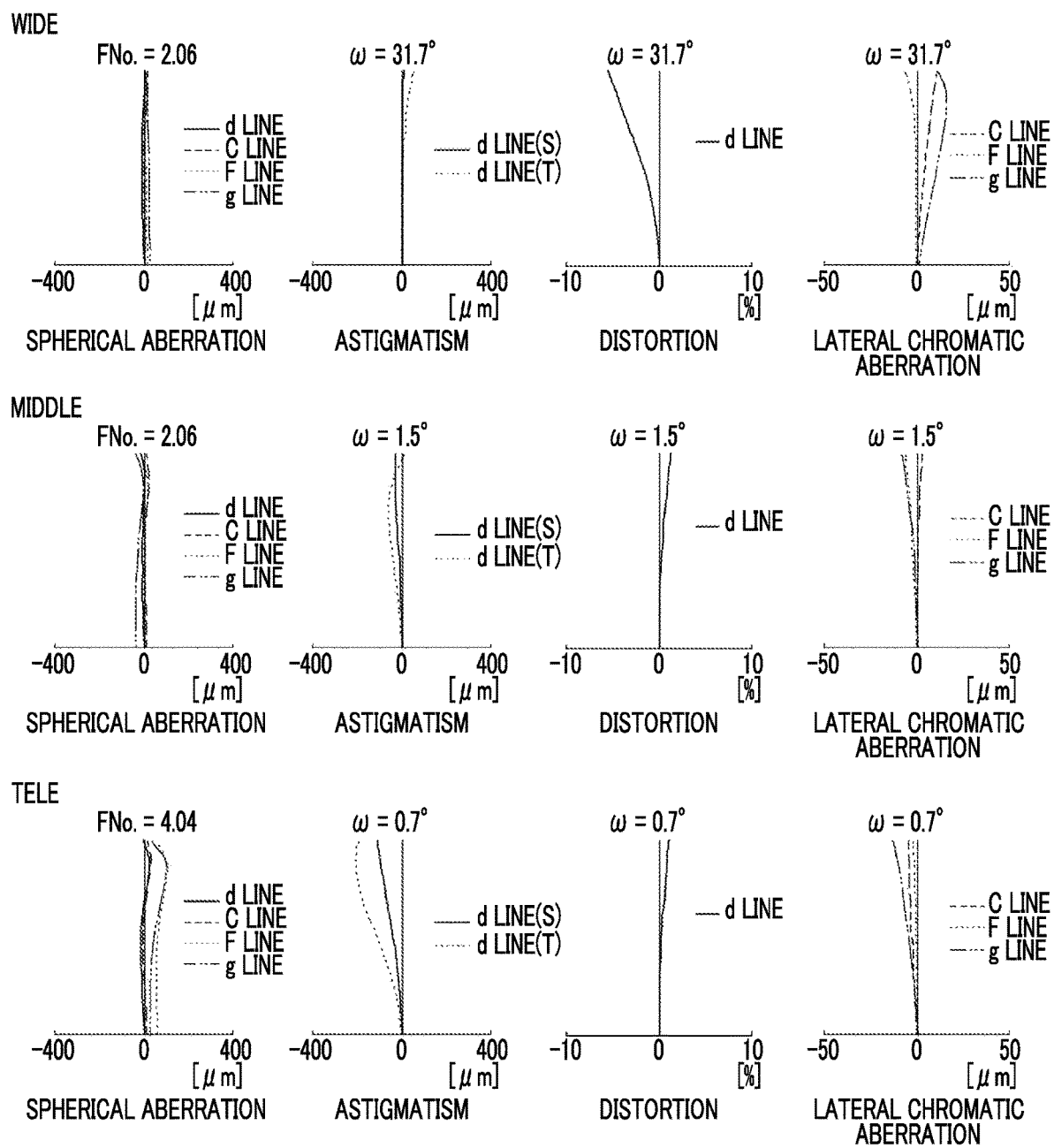
FIG. 12 is a diagram of aberrations of the zoom lens of Example 1 of the present invention.

FIG. 12 shows aberration diagrams in a state where an object at infinity is brought into focus through the zoom lens of Example 1. In FIG. 12, in order from the left side, spherical aberration, astigmatism, distortion, and lateral chromatic aberration are shown. In FIG. 12, the upper part labeled "WIDE" indicates the zoom lens in the wide-angle end state, the middle part labeled "MIDDLE" indicates the zoom lens in the zoom position state where the second lens group G2 is located to be closest to the image side, and the lower part labeled "TELE" indicates the zoom lens in the telephoto end state. In the spherical aberration diagram, aberrations at the d line, the C line, the F line, and the g line are indicated by the solid line, the long dashed line, the short dashed line, and the chain double-dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the chain double-dashed line. In the spherical aberration diagram, FNo. indicates an F number. In the other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 3:
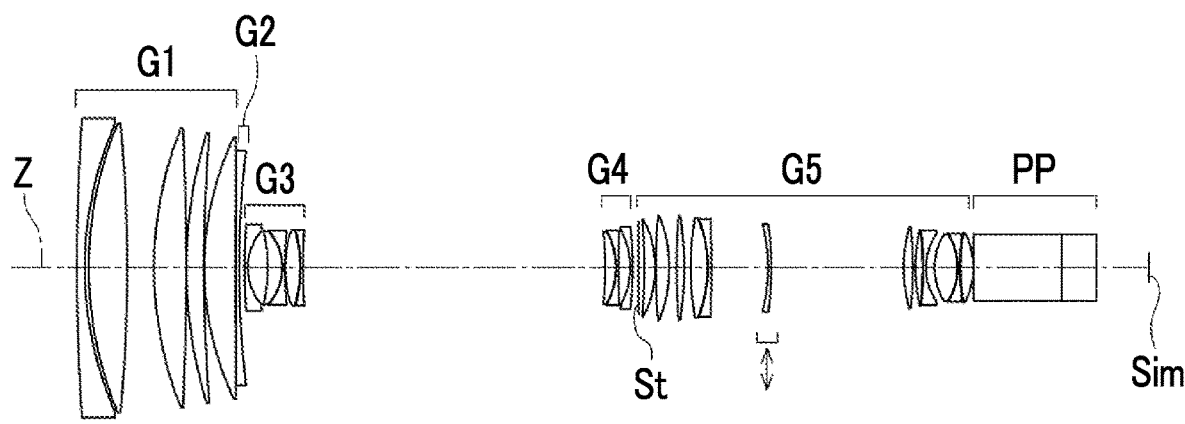
FIG. 3 is a diagram illustrating a cross-sectional view of a configuration of a zoom lens according to Example 2 of the present invention and a movement locus thereof.
Figure 3:
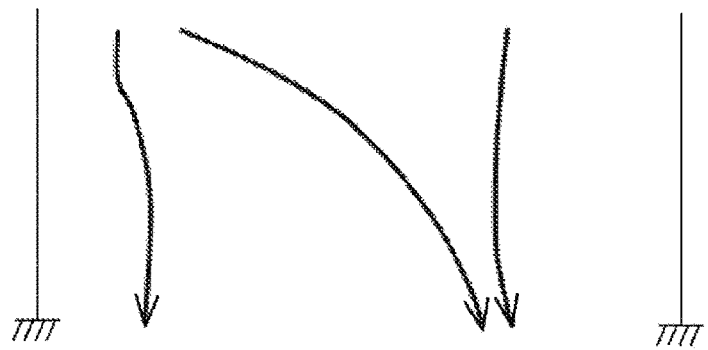
Figure 3:
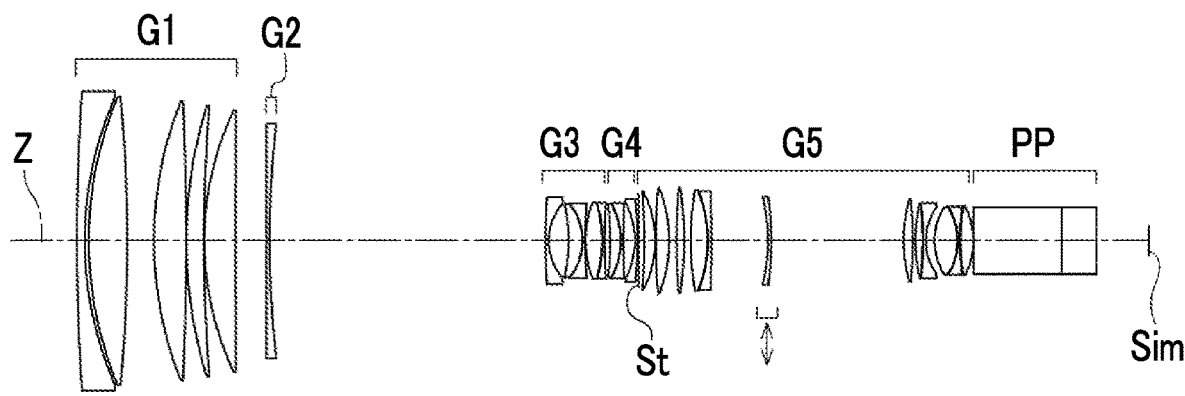

FIG. 3 is a cross-sectional view illustrating a configuration of the zoom lens of Example 2. The zoom lens of Example 2 consists of, in order from the object side to the image side, a first lens group G1 having a positive refractive power; a second lens group G2 having a negative refractive power; a third lens group G3 having a negative refractive power; a fourth lens group G4 having a negative refractive power; and a fifth lens group G5 having a positive refractive power. The fifth lens group G5 corresponds to the rear group Gr. During zooming, the first lens group G1 and the fifth lens group G5 remain with respect to the image plane Sim, and the second lens group G2, the third lens group G3, and the fourth lens group G4 move in the direction of the optical axis by changing the distance between lens groups adjacent to each other. The vibration reduction group consists of a sixth lens from the object side of the fifth lens group G5.

Figure 13:
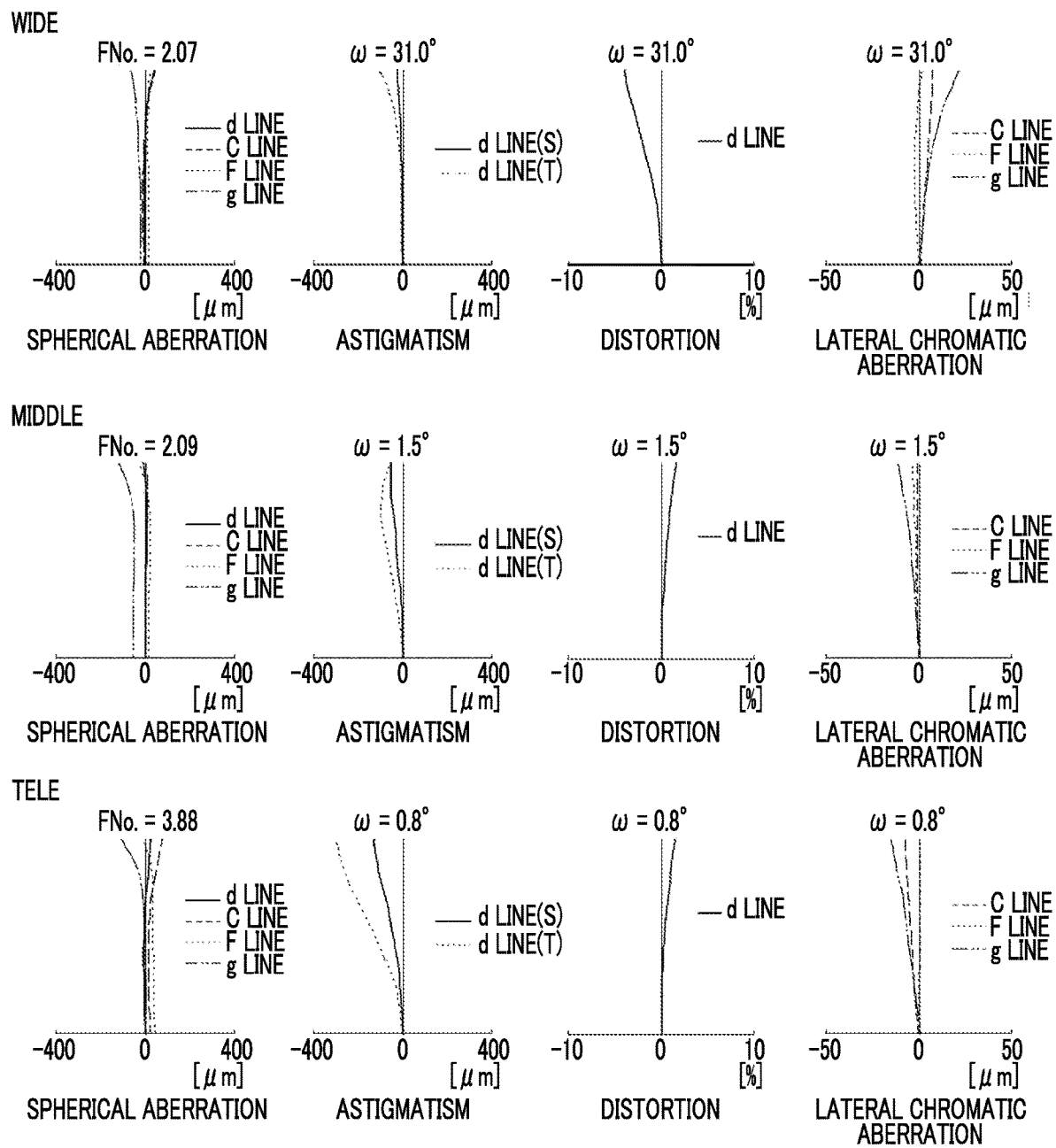
FIG. 13 is a diagram of aberrations of the zoom lens of Example 2 of the present invention.

Tables 4A and 4B show basic lens data of the zoom lens of Example 2, Table 5 shows a specification and variable surface distances, and FIG. 13 shows aberration diagrams in a state where the object at infinity is in focus.

TABLE 4A

Example 2

| Sn | R | D | Nd | vd | θgF |
|---|---|---|---|---|---|
| 1 | 845.23333 | 3.000 | 1.84376 | 43.62 | 0.56036 |
| 2 | 143.06516 | 1.500 | | | |
| 3 | 149.82824 | 14.409 | 1.43387 | 95.18 | 0.53733 |
| 4 | −608.45072 | 10.004 | | | |
| 5 | 148.30025 | 12.151 | 1.43875 | 94.66 | 0.53402 |
| 6 | −1194.91497 | 0.120 | | | |
| 7 | 184.36077 | 6.529 | 1.43875 | 94.66 | 0.53402 |
| 8 | 680.73169 | 0.120 | | | |
| 9 | 120.62369 | 11.828 | 1.43875 | 94.66 | 0.53402 |
| 10 | 13680.63572 | DD[10] | | | |
| 11 | 654447833.87260 | 1.200 | 1.49700 | 81.54 | 0.53748 |
| 12 | 412.47031 | DD[12] | | | |
| 13 | 326.14793 | 1.100 | 1.88631 | 40.11 | 0.56863 |
| 14 | 22.22004 | 7.437 | | | |
| 15 | −68.83847 | 5.598 | 1.89286 | 20.36 | 0.63944 |
| 16 | −21.54509 | 0.970 | 1.88763 | 39.24 | 0.57019 |
| 17 | 164.96523 | 0.120 | | | |
| 18 | 41.41399 | 5.870 | 1.67635 | 31.77 | 0.59399 |
| 19 | −54.80320 | 0.960 | 1.90802 | 35.80 | 0.58069 |
| 20 | 233.65924 | DD[20] | | | |
| 21 | −147.22927 | 4.109 | 1.89999 | 20.00 | 0.63131 |
| 22 | −29.59320 | 0.970 | 1.89494 | 38.51 | 0.57202 |
| 23 | 329.57357 | 4.321 | | | |
| 24 | −31.69751 | 0.960 | 1.80306 | 47.69 | 0.55286 |
| 25 | −153.47550 | DD[25] | | | |

TABLE 4B

Example 2

| Sn | R | D | Nd | vd | θgF |
|---|---|---|---|---|---|
| 26 (St) | ∞ | 2.196 | | | |
| 27 | −219.39447 | 4.073 | 1.69768 | 56.62 | 0.54267 |
| 28 | −41.95201 | 0.120 | | | |
| 29 | 213.26336 | 5.160 | 1.50992 | 80.31 | 0.53786 |
| 30 | −56.62864 | 2.731 | | | |
| 31 | 230.89835 | 2.894 | 1.76797 | 51.99 | 0.55248 |
| 32 | −137.03378 | 2.432 | | | |
| 33 | 115.76326 | 6.368 | 1.49700 | 81.54 | 0.53748 |
| 34 | −53.58531 | 1.350 | 1.86152 | 23.63 | 0.61851 |
| 35 | −1220.59571 | 21.321 | | | |
| 36 | −68.94925 | 1.190 | 1.88300 | 40.76 | 0.56679 |
| 37 | −136.83316 | 50.000 | | | |
| 38 | 59.15418 | 3.392 | 1.81600 | 46.62 | 0.55682 |
| 39 | −166.72457 | 1.000 | | | |
| 40 | 65.02689 | 2.897 | 1.89778 | 24.82 | 0.61573 |
| 41 | −116.99313 | 1.060 | 1.88300 | 40.76 | 0.56679 |
| 42 | 22.42670 | 3.303 | | | |
| 43 | 25.06903 | 8.672 | 1.48749 | 70.24 | 0.53007 |
| 44 | −24.58081 | 0.900 | 1.88300 | 40.76 | 0.56679 |
| 45 | 145.18018 | 0.120 | | | |
| 46 | 73.14752 | 4.917 | 1.48749 | 70.24 | 0.53007 |
| 47 | −29.59918 | 0.000 | | | |
| 48 | ∞ | 33.000 | 1.60859 | 46.44 | 0.56664 |
| 49 | ∞ | 13.200 | 1.51633 | 64.05 | 0.53463 |
| 50 | ∞ | 19.758 | | | |

TABLE 5

Example 2

| | WIDE | MIDDLE | TELE |
|---|---|---|---|
| Zr | 1.0 | 21.8 | 40.5 |
| f | 9.804 | 214.029 | 397.062 |
| FNo. | 2.07 | 2.09 | 3.88 |
| 2ω (°) | 62.0 | 3.0 | 1.6 |

TABLE 5-continued

Example 2

| | WIDE | MIDDLE | TELE |
|---|---|---|---|
| DD[10] | 0.148 | 12.320 | 11.532 |
| DD[12] | 2.064 | 96.694 | 103.962 |
| DD[20] | 113.419 | 3.405 | 1.949 |
| DD[25] | 2.194 | 5.406 | 0.382 |

Example 3

Figure 4:
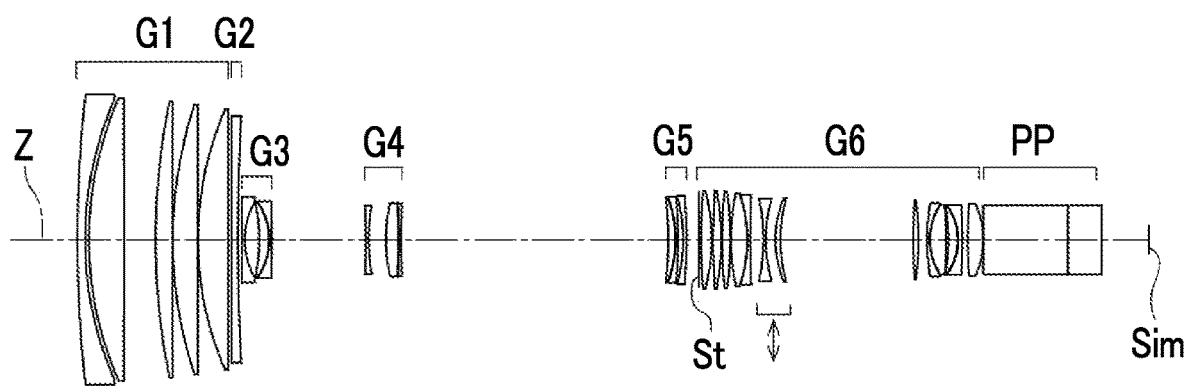
FIG. 4 is a diagram illustrating a cross-sectional view of a configuration of a zoom lens according to Example 3 of the present invention and a movement locus thereof.
Figure 4:
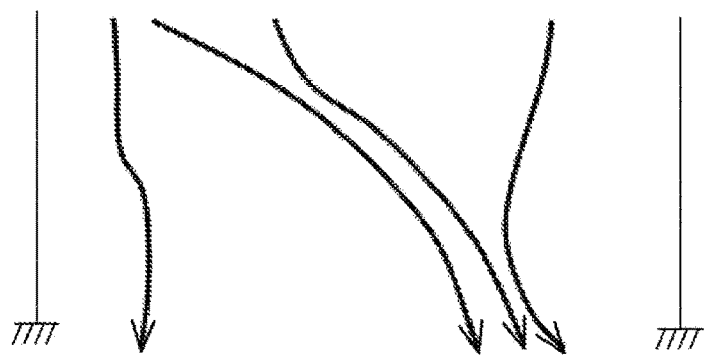
Figure 4:
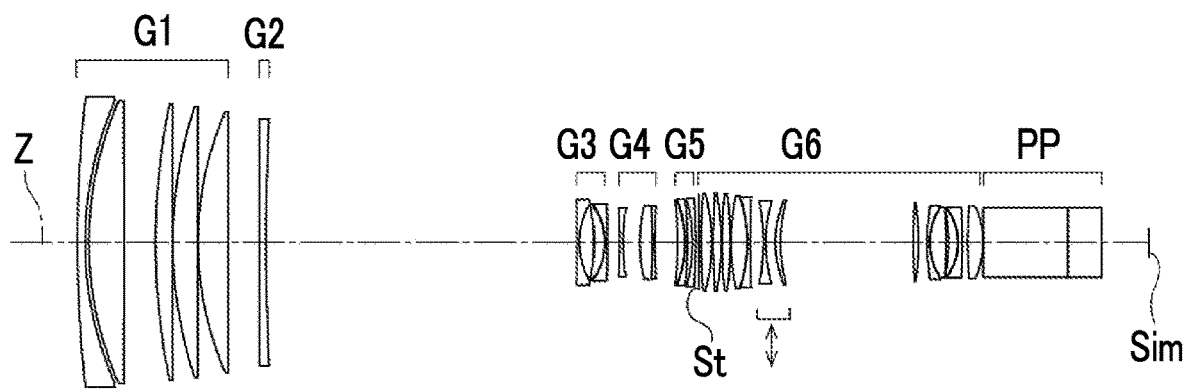

FIG. 4 is a cross-sectional view illustrating a configuration of the zoom lens of Example 3. The zoom lens of Example 3 consists of, in order from the object side to the image side, a first lens group G1 having a positive refractive power; a second lens group G2 having a negative refractive power; a third lens group G3 having a negative refractive power; a fourth lens group G4 having a negative refractive power; a fifth lens group G5 having a negative refractive power; and a sixth lens group G6 having a positive refractive power. The sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the direction of the optical axis by changing the distance between lens groups adjacent to each other. The vibration reduction group consists of a sixth lens and a seventh lens from the object side in the sixth lens group G6.

Figure 14:
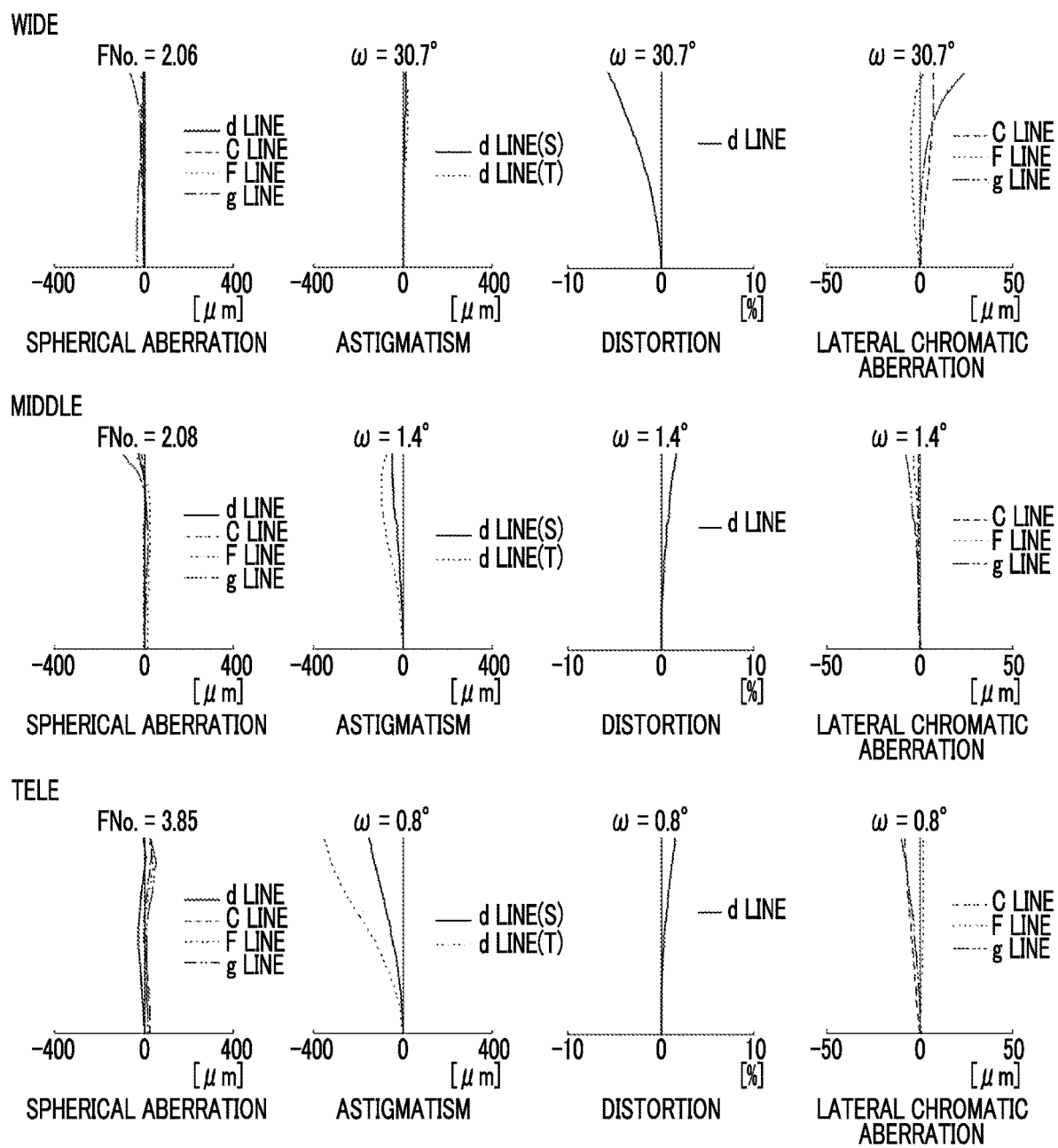
FIG. 14 is a diagram of aberrations of the zoom lens of Example 3 of the present invention.

Tables 6A and 6B show basic lens data of the zoom lens of Example 3, Table 7 shows a specification and variable surface distances, and FIG. 14 shows aberration diagrams in a state where the object at infinity is in focus.

TABLE 6A

Example 3

| Sn | R | D | Nd | vd | θgF |
|---|---|---|---|---|---|
| 1 | 536.26299 | 3.000 | 1.83481 | 42.74 | 0.56490 |
| 2 | 145.10949 | 1.500 | | | |
| 3 | 145.31454 | 13.778 | 1.43387 | 95.18 | 0.53733 |
| 4 | −16443.96163 | 12.193 | | | |
| 5 | 282.29583 | 6.699 | 1.43387 | 95.18 | 0.53733 |
| 6 | 4131608.75756 | 0.120 | | | |
| 7 | 179.37816 | 9.688 | 1.43387 | 95.18 | 0.53733 |
| 8 | −4906488.65949 | 0.120 | | | |
| 9 | 134.16532 | 11.869 | 1.43387 | 95.18 | 0.53733 |
| 10 | 2777777.77778 | DD[10] | | | |
| 11 | ∞ | 2.550 | 1.43875 | 94.66 | 0.53402 |
| 12 | 1011.80105 | DD[12] | | | |
| 13 | −1241.01658 | 1.100 | 1.88300 | 40.76 | 0.56679 |
| 14 | 31.53861 | 5.723 | | | |
| 15 | −74.91246 | 3.939 | 1.89286 | 20.36 | 0.63944 |
| 16 | −26.95121 | 0.970 | 1.77891 | 50.11 | 0.55093 |
| 17 | −692.82440 | DD[17] | | | |
| 18 | −271.50303 | 1.200 | 1.89069 | 38.93 | 0.57316 |
| 19 | 82.94205 | 6.618 | | | |
| 20 | 65.79185 | 5.010 | 1.70593 | 29.70 | 0.60459 |
| 21 | −202.05069 | 0.960 | 1.95169 | 32.56 | 0.58947 |
| 22 | 375.91532 | DD[22] | | | |
| 23 | −181.92824 | 2.931 | 1.86694 | 21.67 | 0.63312 |
| 24 | −49.33093 | 0.960 | 1.90000 | 36.66 | 0.57922 |
| 25 | −180.40603 | 2.007 | | | |
| 26 | −65.96601 | 1.250 | 1.88300 | 40.76 | 0.56679 |
| 27 | −253.84368 | DD[27] | | | |

TABLE 6B

Example 3

| Sn | R | D | Nd | vd | θgF |
|---|---|---|---|---|---|
| 28 (St) | ∞ | 0.746 | | | |
| 29 | 252.85135 | 4.139 | 1.74402 | 54.11 | 0.55594 |
| 30 | −79.87511 | 0.621 | | | |
| 31 | 325.79906 | 3.092 | 1.57789 | 71.15 | 0.54316 |
| 32 | −110.18324 | 0.306 | | | |
| 33 | 201.24582 | 3.199 | 1.72044 | 56.63 | 0.54657 |
| 34 | −162.33564 | 0.348 | | | |
| 35 | 96.03836 | 6.337 | 1.59005 | 69.09 | 0.54396 |
| 36 | −59.05046 | 1.280 | 1.84861 | 23.30 | 0.62402 |
| 37 | 600.83826 | 4.996 | | | |
| 38 | −84.41332 | 1.000 | 1.81197 | 46.80 | 0.55702 |
| 39 | 62.94370 | 3.644 | | | |
| 40 | 43.62913 | 2.078 | 1.89999 | 20.00 | 0.64193 |
| 41 | 66.82517 | 52.194 | | | |
| 42 | 310.33041 | 1.960 | 1.84188 | 31.66 | 0.59545 |
| 43 | −104.99365 | 3.356 | | | |
| 44 | 87.34371 | 1.050 | 1.88310 | 38.85 | 0.57361 |
| 45 | 25.96553 | 6.386 | 1.63246 | 63.77 | 0.54215 |
| 46 | −159.67834 | 1.000 | | | |
| 47 | −74.88038 | 3.683 | 1.48749 | 70.24 | 0.53007 |
| 48 | −23.86444 | 1.692 | 1.78943 | 47.13 | 0.55710 |
| 49 | −249.80868 | 2.063 | | | |
| 50 | 187.61999 | 6.114 | 1.48749 | 70.24 | 0.53007 |
| 51 | −34.58284 | 0.000 | | | |
| 52 | ∞ | 33.000 | 1.60859 | 46.44 | 0.56664 |
| 53 | ∞ | 13.200 | 1.51633 | 64.05 | 0.53463 |
| 54 | ∞ | 18.591 | | | |

TABLE 7

Example 3

| | WIDE | MIDDLE | TELE |
|---|---|---|---|
| Zr | 1.0 | 21.8 | 40.5 |
| f | 10.003 | 218.368 | 405.111 |
| FNo. | 2.06 | 2.08 | 3.85 |
| 2ω (°) | 61.4 | 2.8 | 1.6 |
| DD[10] | 1.200 | 14.143 | 12.178 |
| DD[12] | 1.500 | 113.101 | 121.772 |
| DD[17] | 36.985 | 1.887 | 4.891 |
| DD[22] | 104.216 | 2.263 | 8.672 |
| DD[27] | 5.008 | 17.515 | 1.395 |

Example 4

Figure 5:
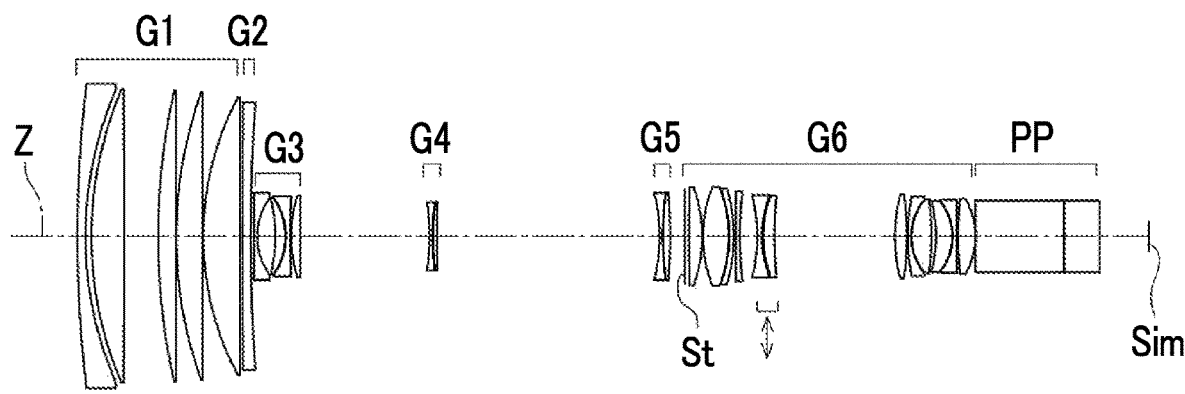
FIG. 5 is a diagram illustrating a cross-sectional view of a configuration of a zoom lens according to Example 4 of the present invention and a movement locus thereof.
Figure 5:
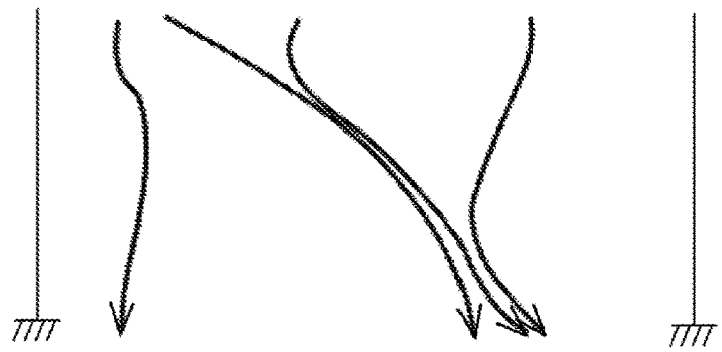
Figure 5:
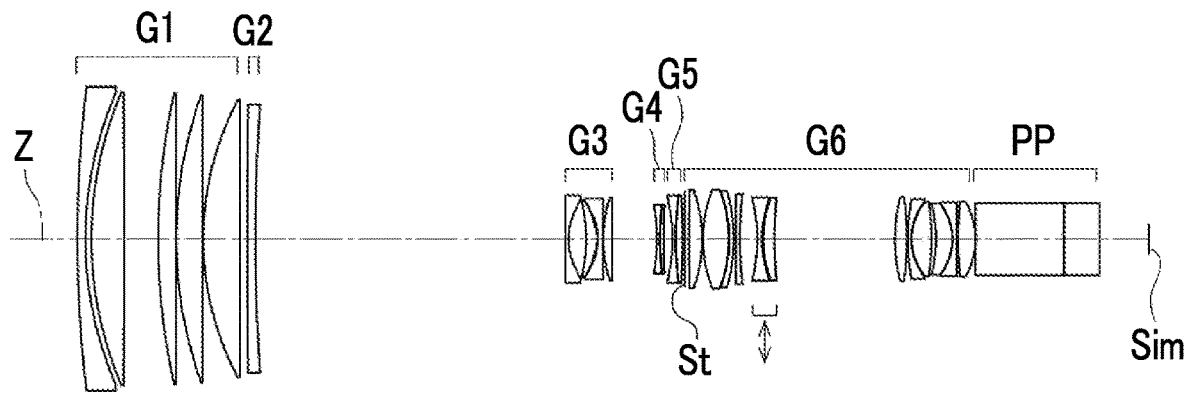

FIG. 5 is a cross-sectional view illustrating a configuration of the zoom lens of Example 4. The zoom lens of Example 4 consists of, in order from the object side to the image side, a first lens group G1 having a positive refractive power; a second lens group G2 having a negative refractive power; a third lens group G3 having a negative refractive power; a fourth lens group G4 having a negative refractive power; a fifth lens group G5 having a negative refractive power; and a sixth lens group G6 having a positive refractive power. The sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the direction of the optical axis by changing the distance between lens groups adjacent to each other. The vibration reduction group consists of a fifth lens and a sixth lens from the object side in the sixth lens group G6.

Figure 15:
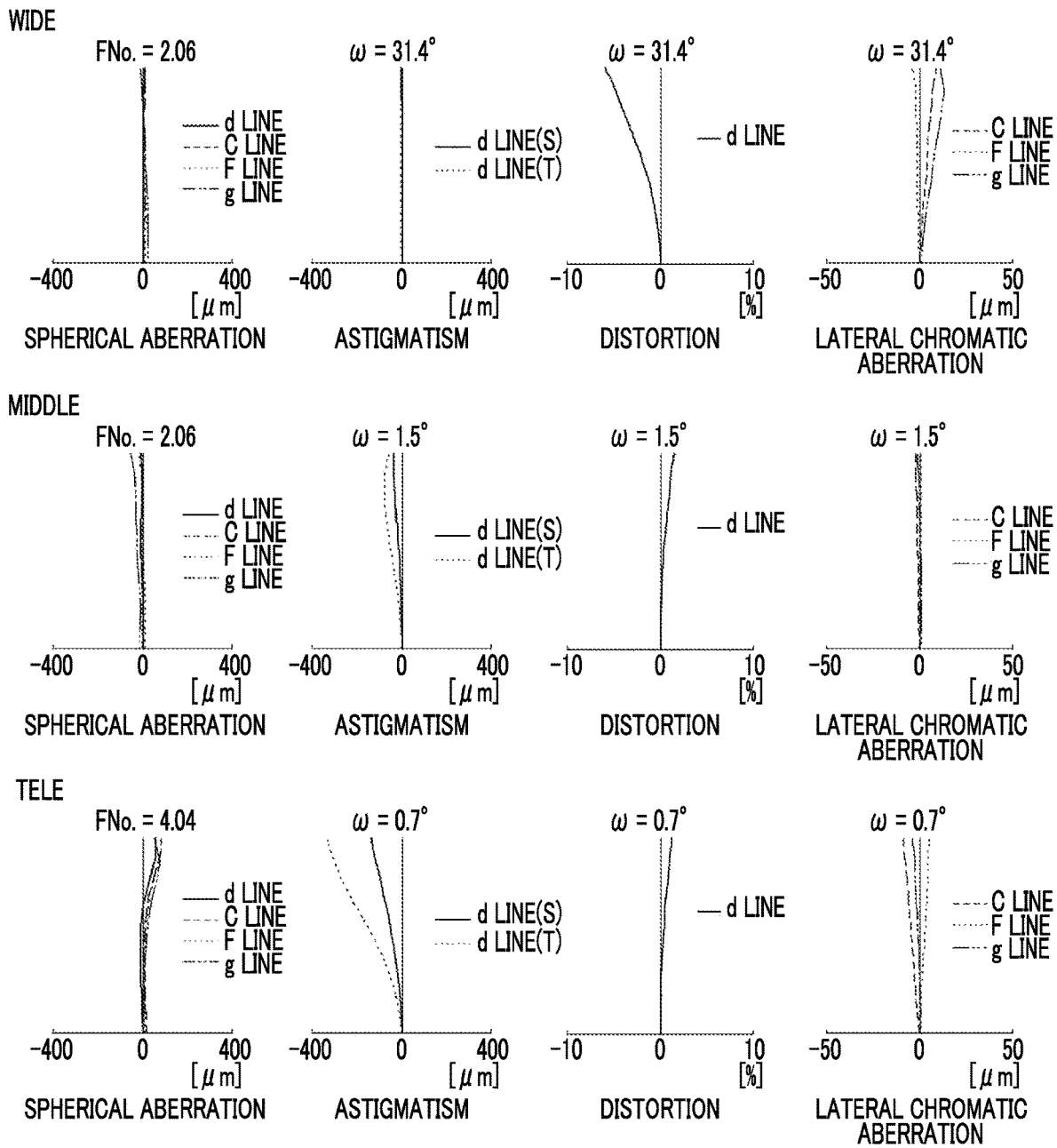
FIG. 15 is a diagram of aberrations of the zoom lens of Example 4 of the present invention.

Tables 8A and 8B show basic lens data of the zoom lens of Example 4, Table 9 shows a specification and variable surface distances, Table 10 shows aspheric surface coefficients, and FIG. 15 shows aberration diagrams in a state where the object at infinity is in focus.

TABLE 8A

Example 4

| Sn | R | D | Nd | vd | θgF |
|---|---|---|---|---|---|
| 1 | 501.97685 | 3.000 | 1.85280 | 42.72 | 0.56223 |
| 2 | 145.13797 | 2.233 | | | |
| 3 | 147.98081 | 12.295 | 1.43387 | 95.18 | 0.53733 |
| 4 | −4986.92954 | 12.515 | | | |
| 5 | 259.91082 | 6.691 | 1.43387 | 95.18 | 0.53733 |
| 6 | ∞ | 0.120 | | | |
| 7 | 168.20706 | 9.861 | 1.43387 | 95.18 | 0.53733 |
| 8 | −90365.72736 | 0.193 | | | |
| 9 | 115.87440 | 13.590 | 1.43387 | 95.18 | 0.53733 |
| 10 | −5804482.26914 | DD[10] | | | |
| 11 | 6203.17000 | 3.000 | 1.58565 | 66.82 | 0.53359 |
| 12 | 748.69566 | DD[12] | | | |
| 13 | 2282.76231 | 1.200 | 1.97705 | 29.89 | 0.59815 |
| 14 | 25.18022 | 6.806 | | | |
| 15 | −63.73904 | 3.868 | 1.89286 | 20.36 | 0.63944 |
| 16 | −26.07118 | 1.949 | 1.89190 | 37.13 | 0.57813 |
| 17 | 385.40872 | 0.301 | | | |
| 18 | 54.14882 | 3.332 | 1.89845 | 20.56 | 0.62944 |
| 19 | 2318.37146 | DD[19] | | | |
| 20 | −87.89972 | 1.210 | 1.73986 | 53.76 | 0.54447 |
| 21 | 98.83317 | 1.475 | 1.99938 | 27.13 | 0.60584 |
| 22 | 359.90201 | DD[22] | | | |
| 23 | −68.75542 | 1.200 | 1.88148 | 39.85 | 0.56870 |
| 24 | 129.80869 | 2.645 | 1.86971 | 21.71 | 0.62460 |
| 25 | −232.93979 | DD[25] | | | |

TABLE 8B

Example 4

| Sn | R | D | Nd | vd | θgF |
|---|---|---|---|---|---|
| 26 (St) | ∞ | 1.520 | | | |
| *27 | 540.45621 | 5.064 | 1.74920 | 52.85 | 0.54558 |
| 28 | −55.56118 | 0.298 | | | |
| 29 | 52.79315 | 9.654 | 1.56745 | 72.91 | 0.54247 |
| 30 | −53.19992 | 1.737 | 1.91262 | 20.33 | 0.63084 |
| 31 | −68.56161 | 0.772 | | | |
| 32 | 1172.10607 | 1.549 | 1.96545 | 17.01 | 0.64525 |
| 33 | 155.34908 | 6.503 | | | |
| *34 | −63.66369 | 1.771 | 1.78709 | 39.79 | 0.57377 |
| 35 | 45.32268 | 0.533 | | | |
| 36 | 46.42509 | 4.065 | 1.87738 | 21.40 | 0.63461 |
| 37 | 152.70675 | 45.298 | | | |
| 38 | 66.00792 | 4.431 | 1.67825 | 32.29 | 0.59817 |
| 39 | −116.35461 | 0.394 | | | |
| 40 | 88.06507 | 1.278 | 1.91781 | 35.91 | 0.57916 |
| 41 | 23.21078 | 7.387 | 1.63590 | 63.45 | 0.54249 |
| 42 | −128.29438 | 1.766 | | | |
| 43 | −56.48185 | 6.193 | 1.48749 | 70.24 | 0.53007 |
| 44 | −22.23880 | 1.654 | 1.80354 | 47.21 | 0.55640 |
| 45 | −2139.07100 | 0.458 | | | |
| 46 | 138.19599 | 6.419 | 1.48749 | 70.24 | 0.53007 |
| 47 | −29.86043 | 0.000 | | | |
| 48 | ∞ | 33.000 | 1.60859 | 46.44 | 0.56664 |
| 49 | ∞ | 13.200 | 1.51633 | 64.05 | 0.53463 |
| 50 | ∞ | 18.616 | | | |

TABLE 9

Example 4

| | WIDE | MIDDLE | TELE |
|---|---|---|---|
| Zr | 1.0 | 22.3 | 44.4 |
| f | 9.754 | 217.107 | 432.632 |
| FNo. | 2.06 | 2.06 | 4.04 |
| 2ω (°) | 62.8 | 3.0 | 1.4 |

TABLE 9-continued

Example 4

| | WIDE | MIDDLE | TELE |
|---|---|---|---|
| DD[10] | 1.117 | 5.744 | 2.887 |
| DD[12] | 1.196 | 107.003 | 115.876 |
| DD[19] | 48.351 | 3.765 | 16.554 |
| DD[22] | 83.083 | 3.732 | 3.176 |
| DD[25] | 5.449 | 18.952 | 0.703 |

TABLE 10

Example 4

| | Sn 34 |
|---|---|
| KA | 1.0000000E+00 |
| A3 | 0.0000000E+00 |
| A4 | 1.5395162E−06 |
| A5 | 1.1552623E−08 |
| A6 | −5.7365838E−10 |
| A7 | 5.6033374E−11 |
| A8 | 3.6382727E−12 |
| A9 | −2.5845187E−13 |
| A10 | −1.3146141E−14 |
| A11 | 6.7815593E−17 |
| A12 | 6.7225852E−18 |
| A13 | 2.5942949E−18 |
| A14 | 6.9659364E−20 |
| A15 | −9.1154036E−21 |
| A16 | 9.3109119E−23 |

Example 5

Figure 6:
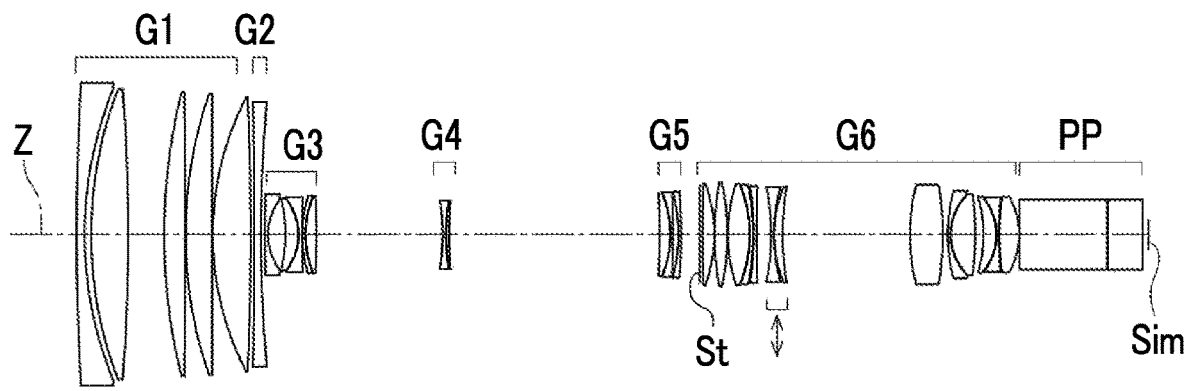
FIG. 6 is a diagram illustrating a cross-sectional view of a configuration of a zoom lens according to Example 5 of the present invention and a movement locus thereof.
Figure 6:
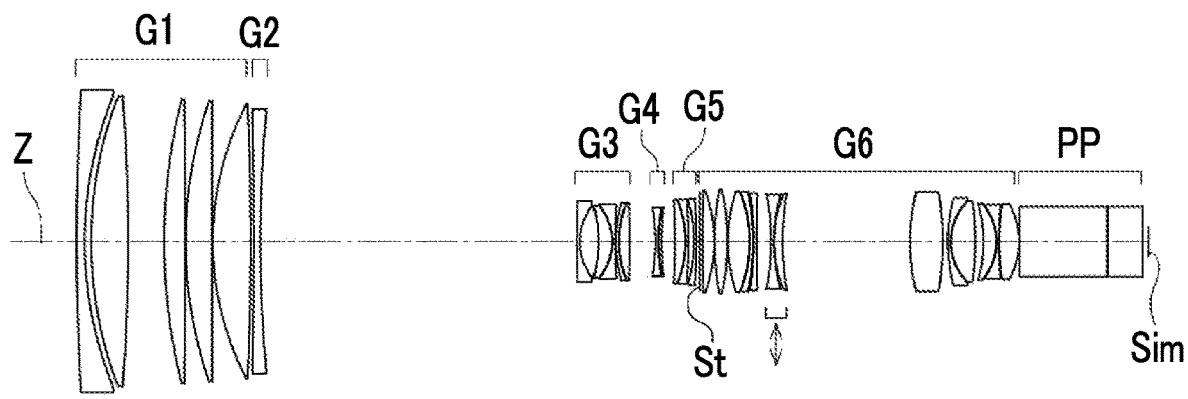

FIG. 6 is a cross-sectional view illustrating a configuration of the zoom lens of Example 5. The zoom lens of Example 5 consists of, in order from the object side to the image side, a first lens group G1 having a positive refractive power; a second lens group G2 having a negative refractive power; a third lens group G3 having a negative refractive power; a fourth lens group G4 having a negative refractive power; a fifth lens group G5 having a negative refractive power; and a sixth lens group G6 having a positive refractive power. The sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the direction of the optical axis by changing the distance between lens groups adjacent to each other. The vibration reduction group consists of a sixth lens and a seventh lens from the object side in the sixth lens group G6.

Figure 16:
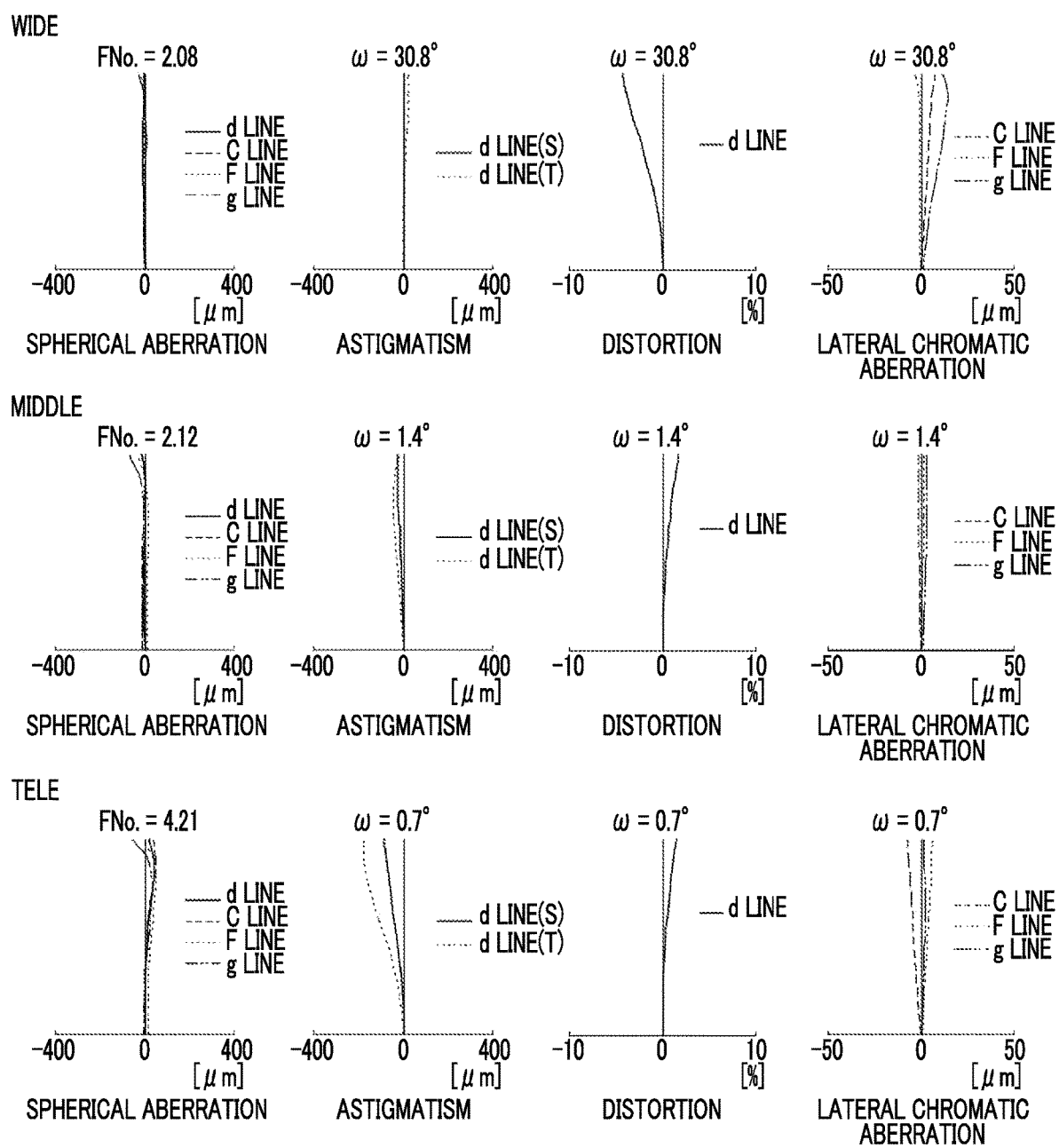
FIG. 16 is a diagram of aberrations of the zoom lens of Example 5 of the present invention.

Tables 11A and 11B show basic lens data of the zoom lens of Example 5, Table 12 shows a specification and variable surface distances, and FIG. 16 shows aberration diagrams in a state where the object at infinity is in focus.

TABLE 11A

Example 5

| Sn | R | D | Nd | vd | θgF |
|---|---|---|---|---|---|
| 1 | 1051.81310 | 3.000 | 1.82964 | 44.89 | 0.55798 |
| 2 | 152.55560 | 2.427 | | | |
| 3 | 159.89751 | 13.859 | 1.43387 | 95.18 | 0.53733 |
| 4 | −734.77564 | 13.446 | | | |
| 5 | 230.20665 | 7.928 | 1.43387 | 95.18 | 0.53733 |

TABLE 11A-continued

Example 5

| Sn | R | D | Nd | vd | θgF |
|---|---|---|---|---|---|
| 6 | −5057.72441 | 0.120 | | | |
| 7 | 171.81084 | 9.839 | 1.43387 | 95.18 | 0.53733 |
| 8 | 2775099.34242 | 0.282 | | | |
| 9 | 116.31797 | 14.190 | 1.43387 | 95.18 | 0.53733 |
| 10 | −1191.06939 | DD[10] | | | |
| 11 | −3131.72775 | 2.550 | 1.55052 | 72.23 | 0.52679 |
| 12 | 559.77131 | DD[12] | | | |
| 13 | 579.06784 | 1.200 | 1.96578 | 30.29 | 0.59694 |
| 14 | 22.76441 | 6.613 | | | |
| 15 | −54.41931 | 5.093 | 1.89286 | 20.36 | 0.63944 |
| 16 | −22.11761 | 1.210 | 1.89190 | 37.13 | 0.57813 |
| 17 | 301.31867 | 0.120 | | | |
| 18 | 51.91350 | 1.200 | 2.00001 | 17.34 | 0.64613 |
| 19 | 39.46575 | 4.089 | 1.87582 | 22.80 | 0.62149 |
| 20 | −345.51314 | DD[20] | | | |
| 21 | −81.16312 | 1.210 | 1.53188 | 75.10 | 0.53873 |
| 22 | 78.39258 | 1.200 | 1.90000 | 34.39 | 0.58573 |
| 23 | 169.28533 | DD[23] | | | |
| 24 | −296.19284 | 4.028 | 1.80241 | 26.13 | 0.60986 |
| 25 | −41.88603 | 0.960 | 1.81529 | 43.63 | 0.56266 |
| 26 | −312.28017 | 2.093 | | | |
| 27 | −62.71952 | 0.960 | 1.88300 | 40.76 | 0.56679 |
| 28 | −224.00273 | DD[28] | | | |

TABLE 11B

Example 5

| Sn | R | D | Nd | vd | θgF |
|---|---|---|---|---|---|
| 29 (St) | ∞ | 1.149 | | | |
| 30 | 575.00010 | 4.286 | 1.74637 | 53.36 | 0.54468 |
| 31 | −58.72936 | 0.120 | | | |
| 32 | 110.83395 | 4.853 | 1.46727 | 89.84 | 0.53589 |
| 33 | −96.76277 | 0.120 | | | |
| 34 | 62.69869 | 8.187 | 1.49697 | 84.82 | 0.53784 |
| 35 | −52.08496 | 1.280 | 1.79192 | 30.08 | 0.60149 |
| 36 | −94.57620 | 0.182 | | | |
| 37 | −126.94212 | 1.200 | 1.88687 | 21.03 | 0.62742 |
| 38 | 976.67406 | 5.363 | | | |
| 39 | −92.02203 | 1.000 | 1.80522 | 46.58 | 0.55777 |
| 40 | 65.88382 | 0.120 | | | |
| 41 | 48.61640 | 3.223 | 1.83586 | 23.54 | 0.62199 |
| 42 | 112.52350 | 47.833 | | | |
| 43 | 80.57501 | 12.282 | 1.71800 | 36.72 | 0.58401 |
| 44 | −121.24667 | 1.875 | | | |
| 45 | 66.89115 | 1.081 | 1.89987 | 37.92 | 0.57359 |
| 46 | 22.35256 | 9.219 | 1.63484 | 63.55 | 0.54238 |
| 47 | −124.36852 | 3.145 | | | |
| 48 | −52.01559 | 4.876 | 1.48749 | 70.24 | 0.53007 |
| 49 | −22.66865 | 0.920 | 1.81801 | 45.92 | 0.55875 |
| 50 | 222.74262 | 0.120 | | | |
| 51 | 96.97878 | 7.386 | 1.48749 | 70.24 | 0.53007 |
| 52 | −29.59806 | 0.000 | | | |
| 53 | ∞ | 33.000 | 1.60859 | 46.44 | 0.56664 |
| 54 | ∞ | 13.200 | 1.51633 | 64.05 | 0.53463 |
| 55 | ∞ | 2.258 | | | |

TABLE 12

Example 5

| | WIDE | MIDDLE | TELE |
|---|---|---|---|
| Zr | 1.0 | 22.3 | 44.4 |
| f | 9.832 | 218.839 | 436.085 |
| FNo. | 2.08 | 2.12 | 4.21 |
| 2ω (°) | 61.6 | 2.8 | 1.4 |
| DD[10] | 1.245 | 2.417 | 1.058 |
| DD[12] | 1.500 | 111.292 | 118.910 |
| DD[20] | 47.341 | 1.467 | 9.527 |
| DD[23] | 78.616 | 2.284 | 4.957 |
| DD[28] | 6.981 | 18.222 | 1.231 |

Example 6

Figure 7:
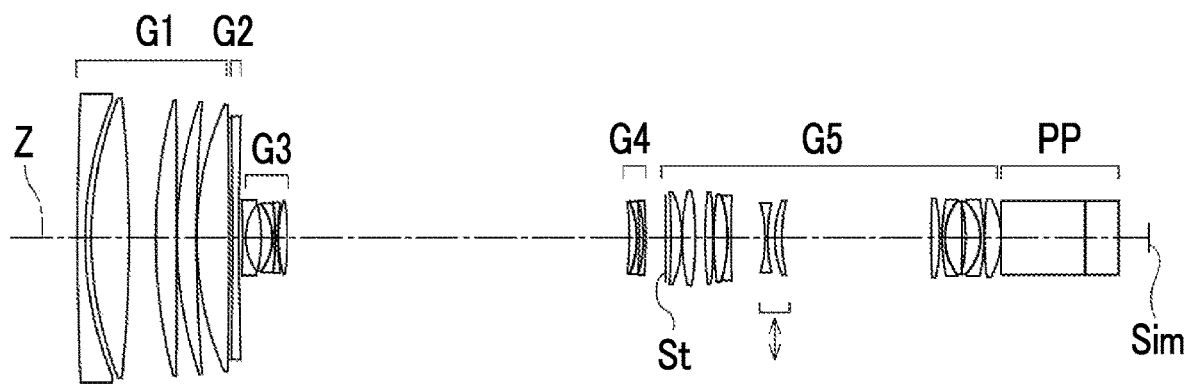
FIG. 7 is a diagram illustrating a cross-sectional view of a configuration of a zoom lens according to Example 6 of the present invention and a movement locus thereof.
Figure 7:
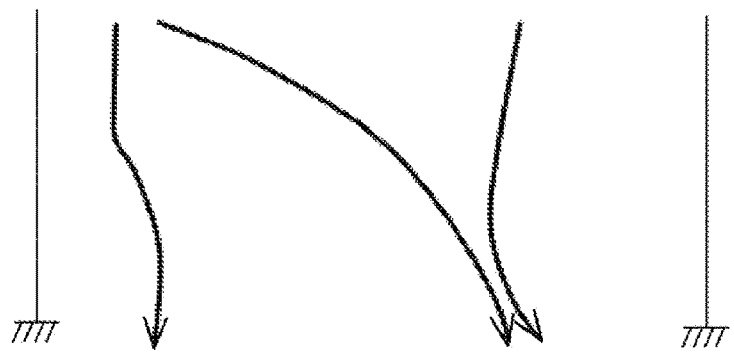
Figure 7:
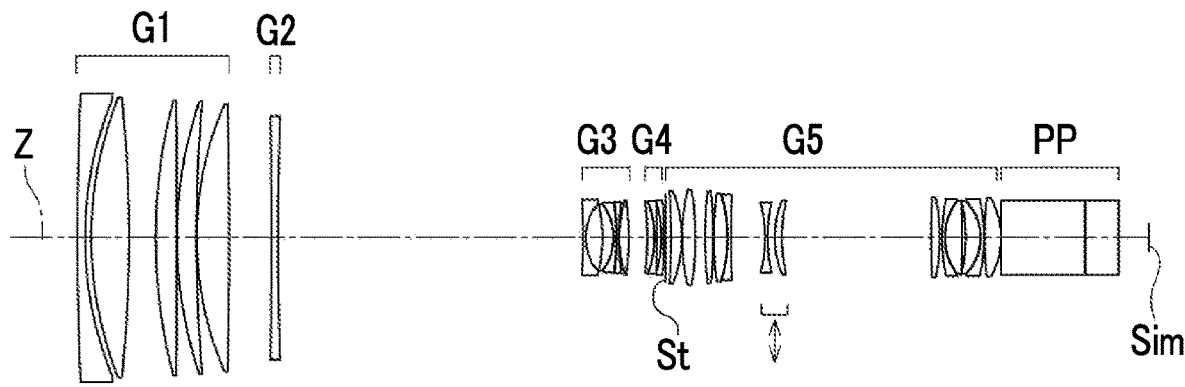

FIG. 7 is a cross-sectional view illustrating a configuration of the zoom lens of Example 6. The zoom lens of Example 6 consists of, in order from the object side to the image side, a first lens group G1 having a positive refractive power; a second lens group G2 having a negative refractive power; a third lens group G3 having a negative refractive power; a fourth lens group G4 having a negative refractive power; and a fifth lens group G5 having a negative refractive power. The fifth lens group G5 corresponds to the rear group Gr. During zooming, the first lens group G1 and the fifth lens group G5 remain with respect to the image plane Sim, and the second lens group G2, the third lens group G3, and the fourth lens group G4 move in the direction of the optical axis by changing the distance between lens groups adjacent to each other. The vibration reduction group consists of a sixth lens and a seventh lens from the object side in the fifth lens group G5.

Figure 17:
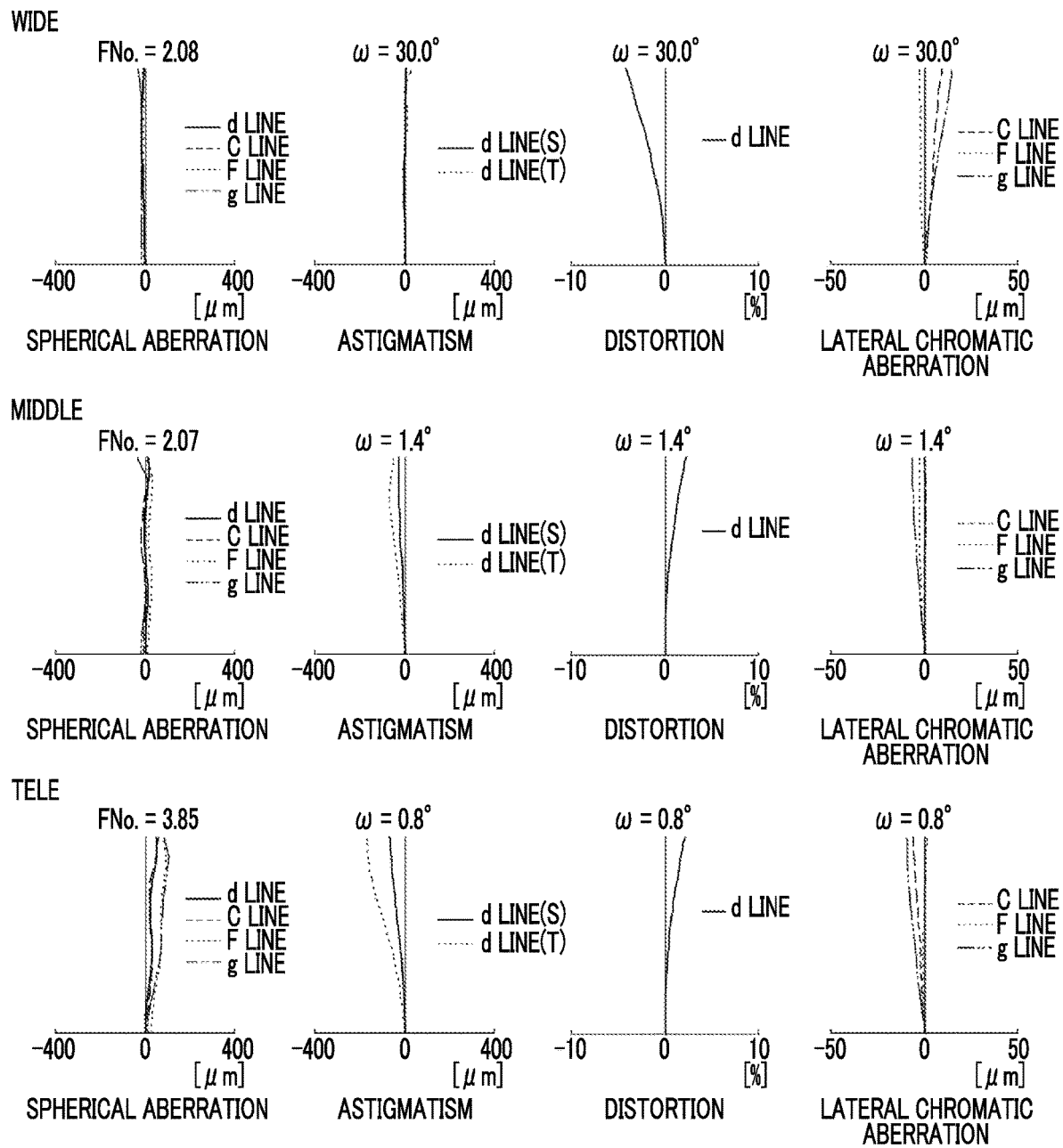
FIG. 17 is a diagram of aberrations of the zoom lens of Example 6 of the present invention.

Tables 13A and 13B show basic lens data of the zoom lens of Example 6, Table 14 shows a specification and variable surface distances, Table 15 shows aspheric surface coefficients, and FIG. 17 shows aberration diagrams in a state where the object at infinity is in focus.

TABLE 13A

Example 6

| Sn | R | D | Nd | vd | θgF |
|---|---|---|---|---|---|
| 1 | 1344.68515 | 3.000 | 1.81132 | 45.33 | 0.56008 |
| 2 | 152.80054 | 2.401 | | | |
| 3 | 156.84480 | 14.908 | 1.43387 | 95.18 | 0.53733 |
| 4 | −552.26231 | 10.384 | | | |
| 5 | 225.18434 | 8.278 | 1.43387 | 95.18 | 0.53733 |
| 6 | −8234.81947 | 0.120 | | | |
| 7 | 176.48076 | 7.603 | 1.43387 | 95.18 | 0.53733 |
| 8 | 667.99064 | 0.120 | | | |
| 9 | 138.30272 | 12.850 | 1.43387 | 95.18 | 0.53733 |
| 10 | −2318.75979 | DD[10] | | | |
| 11 | −3090.11707 | 2.550 | 1.49700 | 81.54 | 0.53748 |
| 12 | 1653.80284 | DD[12] | | | |
| *13 | −226.32305 | 1.100 | 1.91082 | 35.25 | 0.58224 |
| 14 | 22.62445 | 6.164 | | | |
| 15 | −61.25738 | 4.461 | 1.89286 | 20.36 | 0.63944 |
| 16 | −22.56043 | 0.960 | 1.89386 | 38.61 | 0.57175 |
| 17 | −135.92828 | 0.257 | | | |
| 18 | −106.75108 | 0.960 | 1.89999 | 27.11 | 0.60831 |
| 19 | 141.75360 | 0.120 | | | |
| 20 | 56.95783 | 3.500 | 1.87944 | 26.21 | 0.61106 |
| 21 | −123.82822 | DD[21] | | | |
| 22 | −125.92852 | 2.961 | 1.90000 | 20.00 | 0.63132 |
| 23 | −39.37507 | 0.970 | 1.90000 | 38.00 | 0.57332 |
| 24 | −219.79688 | 1.647 | | | |
| 25 | −53.94708 | 0.960 | 1.88299 | 40.77 | 0.56679 |
| 26 | −210.52928 | DD[26] | | | |

TABLE 13B

Example 6

| Sn | R | D | Nd | vd | θgF |
|---|---|---|---|---|---|
| 27 (St) | ∞ | 2.044 | | | |
| 28 | −312.05014 | 4.255 | 1.70518 | 57.84 | 0.55291 |
| 29 | −51.31103 | 0.120 | | | |
| 30 | 84.98369 | 5.275 | 1.58185 | 70.48 | 0.54342 |
| 31 | −123.91585 | 3.796 | | | |
| 32 | 161.34981 | 3.244 | 1.69560 | 59.05 | 0.54348 |
| 33 | −185.74994 | 0.120 | | | |
| 34 | 126.05105 | 5.447 | 1.59104 | 68.92 | 0.54402 |
| 35 | −61.08507 | 1.280 | 1.85659 | 22.46 | 0.62183 |
| 36 | 374.54798 | 13.441 | | | |
| 37 | −57.12315 | 1.000 | 1.85437 | 42.56 | 0.56256 |
| 38 | 65.78640 | 2.799 | | | |
| 39 | 39.88351 | 2.834 | 1.90000 | 20.00 | 0.63132 |
| 40 | 65.83800 | 58.845 | | | |
| 41 | 346.71348 | 3.460 | 1.76584 | 26.71 | 0.60742 |
| 42 | −82.92558 | 1.000 | | | |
| 43 | 83.75895 | 1.050 | 1.88152 | 39.85 | 0.57089 |
| 44 | 25.54291 | 6.789 | 1.63537 | 63.50 | 0.54243 |
| 45 | −275.28490 | 1.300 | | | |
| 46 | −66.45113 | 5.896 | 1.48749 | 70.24 | 0.53007 |
| 47 | −21.38581 | 1.402 | 1.83465 | 40.10 | 0.57158 |
| 48 | −72.15254 | 0.175 | | | |
| 49 | 144.68253 | 6.507 | 1.48749 | 70.24 | 0.53007 |
| 50 | −33.42454 | 0.000 | | | |
| 51 | ∞ | 33.000 | 1.60859 | 46.44 | 0.56664 |
| 52 | ∞ | 13.200 | 1.51633 | 64.05 | 0.53463 |
| 53 | ∞ | 11.942 | | | |

TABLE 14

Example 6

| | WIDE | MIDDLE | TELE |
|---|---|---|---|
| Zr | 1.0 | 21.8 | 40.5 |
| f | 10.127 | 221.070 | 410.125 |
| FNo. | 2.08 | 2.07 | 3.85 |
| 2ω (°) | 60.0 | 2.8 | 1.6 |
| DD[10] | 1.200 | 18.415 | 16.632 |
| DD[12] | 1.500 | 111.515 | 120.298 |
| DD[21] | 134.482 | 0.516 | 7.351 |
| DD[26] | 7.825 | 14.561 | 0.725 |

TABLE 15

Example 6

| | Sn 13 |
|---|---|
| KA | 1.0000000E+00 |
| A4 | 2.1692714E−06 |
| A6 | 3.4930233E−08 |
| A8 | −8.9050327E−10 |
| A10 | 1.2599252E−11 |
| A12 | −1.1429267E−13 |
| A14 | 6.6756614E−16 |
| A16 | −2.4025793E−18 |
| A18 | 4.8120756E−21 |
| A20 | −4.0836657E−24 |

Example 7

Figure 8:
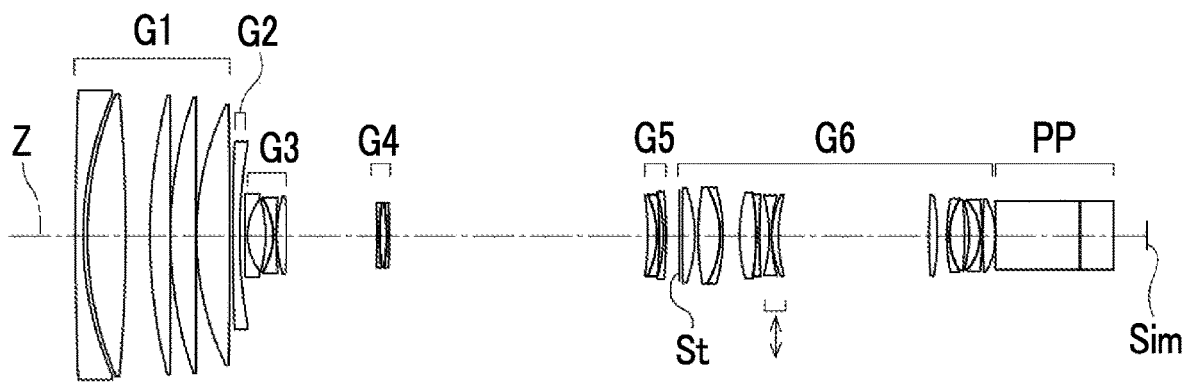
FIG. 8 is a diagram illustrating a cross-sectional view of a configuration of a zoom lens according to Example 7 of the present invention and a movement locus thereof.
Figure 8:
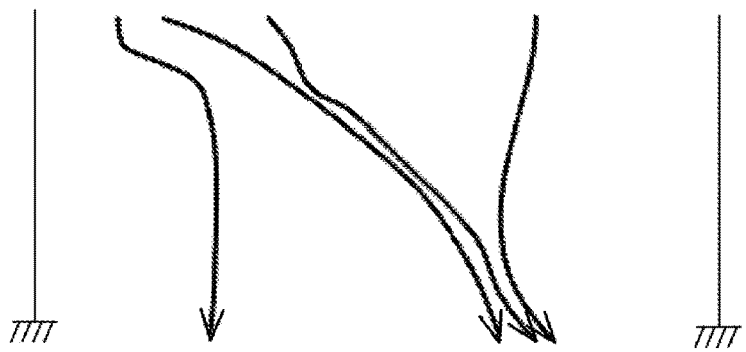
Figure 8:
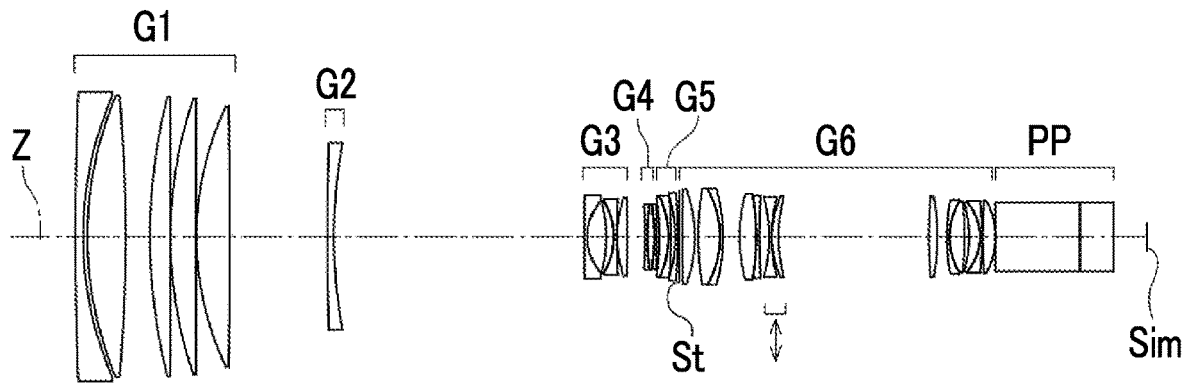

FIG. 8 is a cross-sectional view illustrating a configuration of the zoom lens of Example 7. The zoom lens of Example 7 consists of, in order from the object side to the image side, a first lens group G1 having a positive refractive power; a second lens group G2 having a negative refractive power; a third lens group G3 having a negative refractive power; a fourth lens group G4 having a negative refractive power; a fifth lens group G5 having a negative refractive power; and a sixth lens group G6 having a positive refractive power. The sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the direction of the optical axis by changing the distance between lens groups adjacent to each other. The vibration reduction group consists of a sixth lens and a seventh lens from the object side in the sixth lens group G6.

Figure 18:
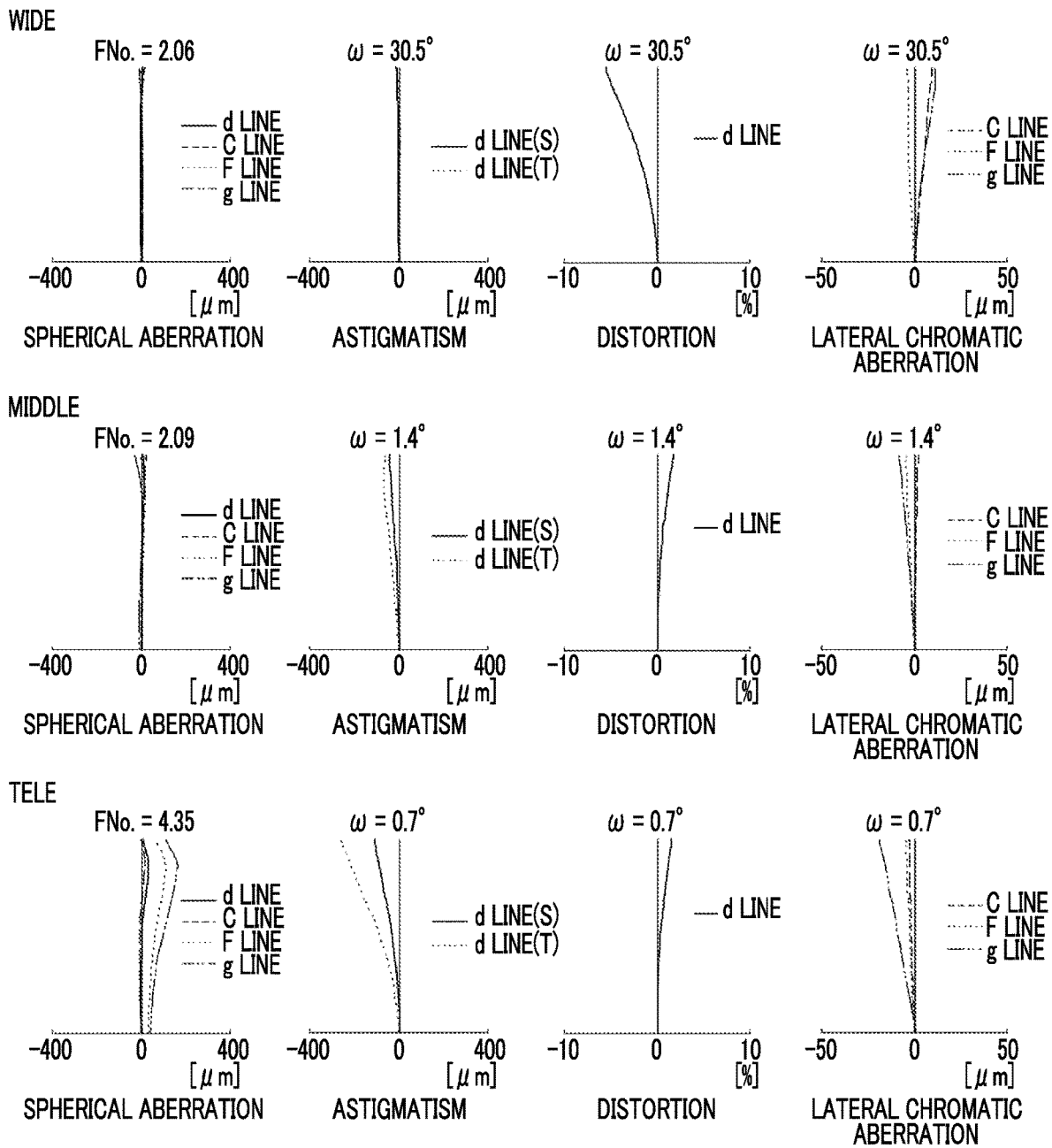
FIG. 18 is a diagram of aberrations of the zoom lens of Example 7 of the present invention.

Tables 16A and 16B show basic lens data of the zoom lens of Example 7, Table 17 shows a specification and variable surface distances, and FIG. 18 shows aberration diagrams in a state where the object at infinity is in focus.

TABLE 16A

Example 7

| Sn | R | D | Nd | vd | θgF |
|---|---|---|---|---|---|
| 1 | 1555.23671 | 3.000 | 1.80400 | 46.53 | 0.55775 |
| 2 | 146.65470 | 1.681 | | | |
| 3 | 150.64334 | 15.000 | 1.43387 | 95.18 | 0.53733 |
| 4 | −653.82981 | 9.473 | | | |
| 5 | 233.11537 | 7.979 | 1.43387 | 95.18 | 0.53733 |
| 6 | −14982.54054 | 0.120 | | | |
| 7 | 177.80212 | 10.006 | 1.43387 | 95.18 | 0.53733 |
| 8 | −37666.92429 | 0.120 | | | |
| 9 | 124.79361 | 13.158 | 1.43387 | 95.18 | 0.53733 |
| 10 | −2943.36943 | DD[10] | | | |
| 11 | 1164.37477 | 2.550 | 1.53775 | 74.70 | 0.53936 |
| 12 | 209.48974 | DD[12] | | | |
| 13 | 2447.66252 | 1.100 | 1.86599 | 40.63 | 0.57022 |
| 14 | 24.03970 | 7.083 | | | |
| 15 | −57.97789 | 3.008 | 1.89999 | 20.00 | 0.63131 |
| 16 | −28.64720 | 1.210 | 1.88203 | 39.72 | 0.56906 |
| 17 | 265.29611 | 0.120 | | | |
| 18 | 52.16908 | 3.858 | 1.89814 | 24.52 | 0.61672 |
| 19 | −526.46999 | DD[19] | | | |
| 20 | −198.09876 | 0.960 | 1.84548 | 43.45 | 0.56319 |
| 21 | 115.80831 | 2.594 | 1.64375 | 40.56 | 0.57681 |
| 22 | −102.13011 | 0.960 | 1.86560 | 41.44 | 0.56501 |
| 23 | −562.30261 | DD[23] | | | |
| 24 | −132.00616 | 3.622 | 1.89833 | 20.83 | 0.62857 |
| 25 | −39.18174 | 0.970 | 1.89654 | 36.84 | 0.57725 |
| 26 | −184.80712 | 1.622 | | | |
| 27 | −60.42866 | 0.960 | 1.87204 | 40.26 | 0.57414 |
| 28 | −258.18342 | DD[28] | | | |

TABLE 16B

Example 7

| Sn | R | D | Nd | vd | θgF |
|---|---|---|---|---|---|
| 29 (St) | ∞ | 1.063 | | | |
| 30 | 833.49031 | 4.959 | 1.74188 | 54.31 | 0.55577 |
| 31 | −56.61697 | 1.340 | | | |
| 32 | 118.48209 | 8.544 | 1.67013 | 61.58 | 0.54282 |
| 33 | −40.28605 | 1.200 | 1.90687 | 32.92 | 0.58946 |
| 34 | −72.43680 | 6.422 | | | |
| 35 | 65.54471 | 6.566 | 1.59692 | 68.84 | 0.54090 |
| 36 | −105.26376 | 1.280 | 1.89796 | 20.11 | 0.63085 |
| 37 | 283.75121 | 3.740 | | | |
| 38 | −65.11129 | 1.000 | 1.79550 | 48.45 | 0.55163 |
| 39 | 64.48379 | 0.120 | | | |
| 40 | 39.60836 | 2.628 | 1.84243 | 24.46 | 0.61551 |
| 41 | 64.92014 | 59.123 | | | |
| 42 | 189.16806 | 3.399 | 1.77093 | 26.92 | 0.60704 |
| 43 | −89.69776 | 3.699 | | | |
| 44 | 78.48015 | 1.050 | 1.89056 | 37.73 | 0.57647 |
| 45 | 28.43213 | 5.668 | 1.64102 | 62.98 | 0.54299 |

TABLE 16B-continued

Example 7

| Sn | R | D | Nd | vd | θgF |
|---|---|---|---|---|---|
| 46 | −278.24025 | 1.957 | | | |
| 47 | −52.11121 | 4.332 | 1.48749 | 70.24 | 0.53007 |
| 48 | −21.45472 | 0.900 | 1.83344 | 42.55 | 0.56561 |
| 49 | −119.79901 | 0.120 | | | |
| 50 | 184.42588 | 5.086 | 1.48749 | 70.24 | 0.53007 |
| 51 | −30.42049 | 0.000 | | | |
| 52 | ∞ | 33.000 | 1.60859 | 46.44 | 0.56664 |
| 53 | ∞ | 13.200 | 1.51633 | 64.05 | 0.53463 |
| 54 | ∞ | 13.143 | | | |

TABLE 17

Example 7

| | WIDE | MIDDLE | TELE |
|---|---|---|---|
| Zr | 1.0 | 21.8 | 45.3 |
| f | 10.063 | 219.678 | 455.842 |
| FNo. | 2.06 | 2.09 | 4.35 |
| 2ω (°) | 61.0 | 2.8 | 1.4 |
| DD[10] | 1.200 | 40.050 | 38.404 |
| DD[12] | 2.000 | 87.591 | 98.451 |
| DD[19] | 35.878 | 1.031 | 7.022 |
| DD[23] | 101.273 | 1.034 | 1.039 |
| DD[28] | 5.279 | 15.923 | 0.714 |

Example 8

Figure 9:
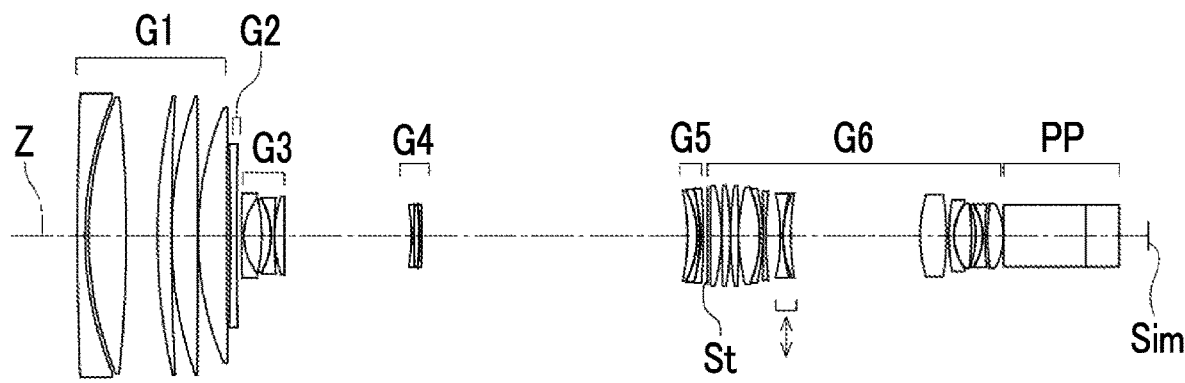
FIG. 9 is a diagram illustrating a cross-sectional view of a configuration of a zoom lens according to Example 8 of the present invention and a movement locus thereof.
Figure 9:
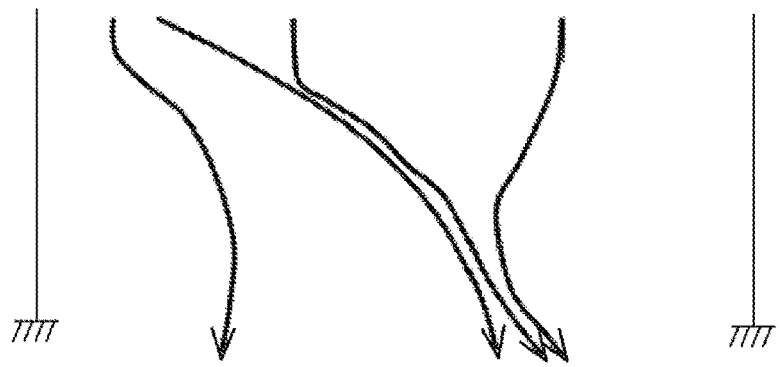
Figure 9:
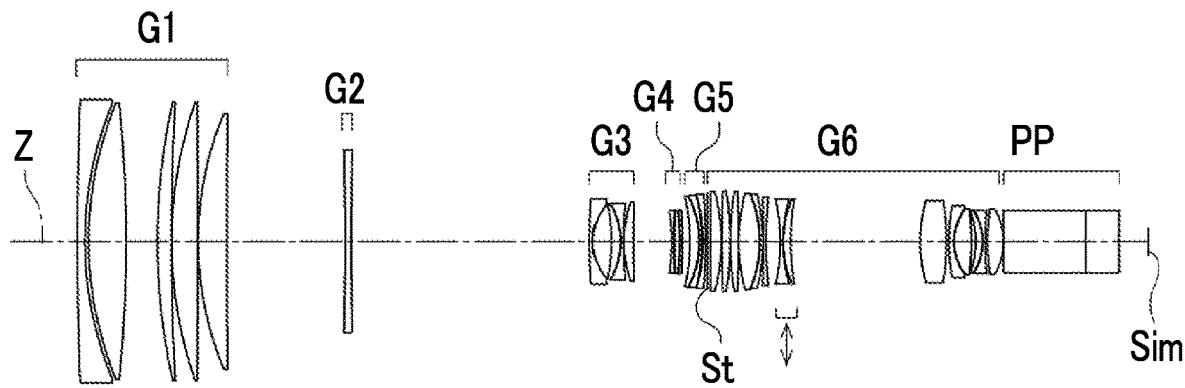

FIG. 9 is a cross-sectional view illustrating a configuration of the zoom lens of Example 8. The zoom lens of Example 8 consists of, in order from the object side to the image side, a first lens group G1 having a positive refractive power; a second lens group G2 having a negative refractive power; a third lens group G3 having a negative refractive power; a fourth lens group G4 having a negative refractive power; a fifth lens group G5 having a negative refractive power; and a sixth lens group G6 having a positive refractive power. The sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the direction of the optical axis by changing the distance between lens groups adjacent to each other. The vibration reduction group consists of a seventh lens and an eighth lens from the object side in the sixth lens group G6.

Figure 19:
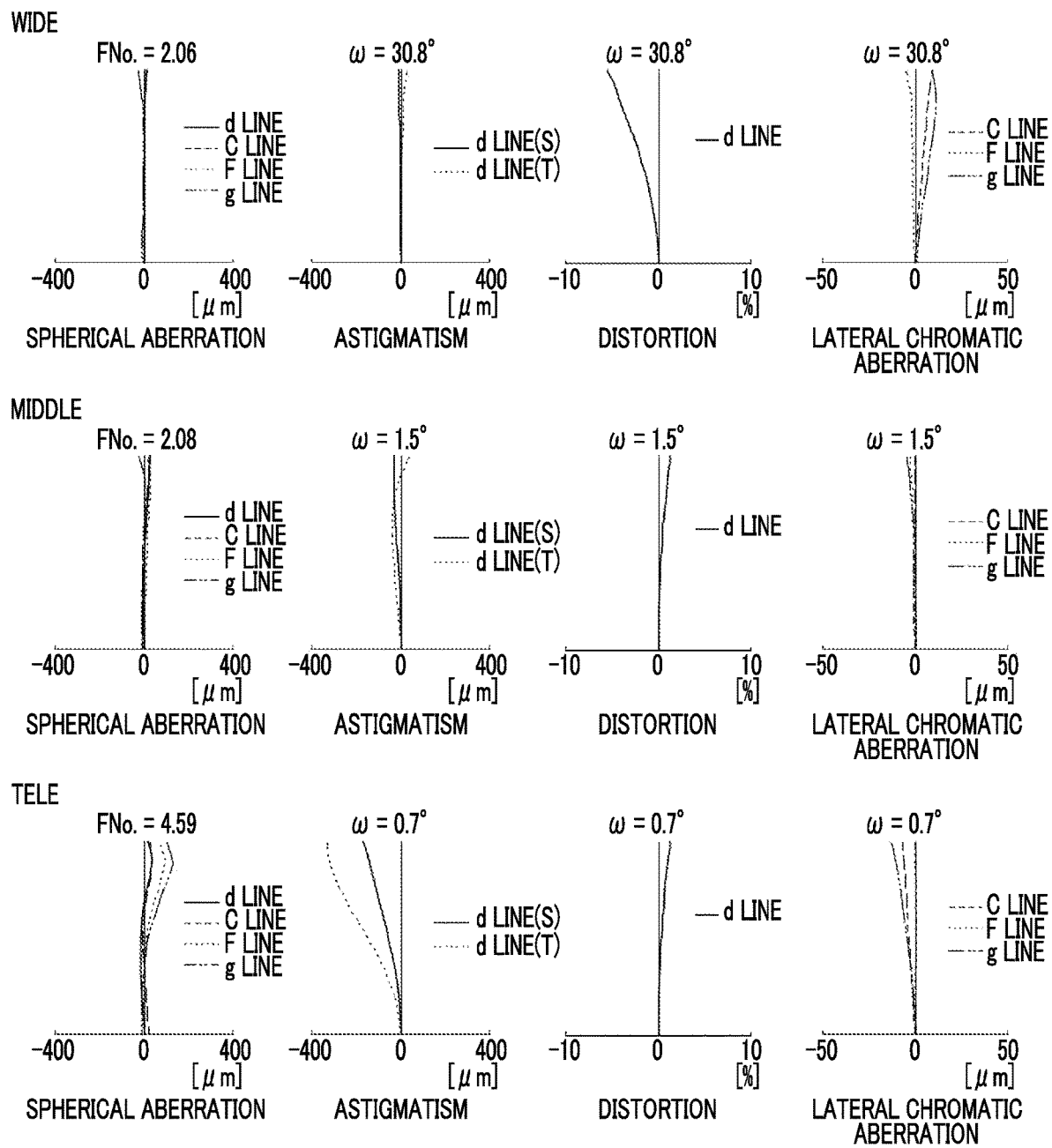
FIG. 19 is a diagram of aberrations of the zoom lens of Example 8 of the present invention.

Tables 18A and 18B show basic lens data of the zoom lens of Example 8, Table 19 shows a specification and variable surface distances, and FIG. 19 shows aberration diagrams in a state where the object at infinity is in focus.

TABLE 18A

Example 8

| Sn | R | D | Nd | vd | θgF |
|---|---|---|---|---|---|
| 1 | 1488.67328 | 3.000 | 1.80400 | 46.53 | 0.55775 |
| 2 | 152.78584 | 1.500 | | | |
| 3 | 153.82280 | 15.000 | 1.43387 | 95.18 | 0.53733 |
| 4 | −582.34417 | 12.487 | | | |
| 5 | 268.29986 | 5.610 | 1.43875 | 94.66 | 0.53402 |
| 6 | 1011.43318 | 0.120 | | | |
| 7 | 178.69638 | 10.458 | 1.43387 | 95.18 | 0.53733 |
| 8 | −5918.70118 | 0.120 | | | |

TABLE 18A-continued

Example 8

| Sn | R | D | Nd | vd | θgF |
|---|---|---|---|---|---|
| 9 | 138.74356 | 11.611 | 1.43387 | 95.18 | 0.53733 |
| 10 | 13100.45107 | DD[10] | | | |
| 11 | −1653.00583 | 2.550 | 1.53775 | 74.70 | 0.53936 |
| 12 | 2214.46108 | DD[12] | | | |
| 13 | 346.30453 | 1.100 | 1.91082 | 35.25 | 0.58224 |
| 14 | 24.31494 | 7.256 | | | |
| 15 | −71.54517 | 3.692 | 1.90000 | 20.00 | 0.63132 |
| 16 | −31.29477 | 1.210 | 1.89999 | 37.88 | 0.57372 |
| 17 | 195.27825 | 0.120 | | | |
| 18 | 50.94502 | 3.910 | 1.89113 | 24.96 | 0.61516 |
| 19 | 2670.44830 | DD[19] | | | |
| 20 | −82.65215 | 0.960 | 1.92000 | 35.79 | 0.58116 |
| 21 | 239.44746 | 2.345 | 1.90000 | 22.56 | 0.62306 |
| 22 | −105.20983 | 0.970 | 1.89467 | 37.81 | 0.57427 |
| 23 | −246.24421 | DD[23] | | | |
| 24 | −88.81372 | 3.772 | 1.90000 | 22.85 | 0.62212 |
| 25 | −41.52195 | 0.970 | 1.86783 | 38.33 | 0.57425 |
| 26 | −83.24440 | 0.522 | | | |
| 27 | −68.28328 | 0.960 | 1.88759 | 38.67 | 0.57582 |
| 28 | −269.11471 | DD[28] | | | |

TABLE 18B

Example 8

| Sn | R | D | Nd | vd | θgF |
|---|---|---|---|---|---|
| 29 (St) | ∞ | 1.331 | | | |
| 30 | 1844.95443 | 4.375 | 1.80631 | 48.13 | 0.56080 |
| 31 | −76.43226 | 0.120 | | | |
| 32 | 422.88609 | 3.335 | 1.56307 | 73.65 | 0.54218 |
| 33 | −139.50489 | 0.120 | | | |
| 34 | 136.12314 | 3.112 | 1.70038 | 58.58 | 0.54408 |
| 35 | −720.16657 | 0.120 | | | |
| 36 | 78.25926 | 8.464 | 1.47905 | 87.85 | 0.53667 |
| 37 | −51.28085 | 1.280 | 1.88964 | 20.52 | 0.62917 |
| 38 | −80.90645 | 0.120 | | | |
| 39 | −642.72627 | 1.200 | 1.98240 | 17.74 | 0.64356 |
| 40 | 209.29773 | 5.681 | | | |
| 41 | −78.96760 | 1.000 | 1.84629 | 43.37 | 0.56087 |
| 42 | 59.90897 | 0.120 | | | |
| 43 | 44.36939 | 2.901 | 1.90000 | 20.27 | 0.63046 |
| 44 | 93.81275 | 52.176 | | | |
| 45 | 63.98420 | 10.507 | 1.76625 | 29.86 | 0.59974 |
| 46 | −110.74987 | 1.000 | | | |
| 47 | 82.83461 | 2.117 | 1.90000 | 37.17 | 0.57776 |
| 48 | 23.20327 | 6.886 | 1.64793 | 62.35 | 0.54367 |
| 49 | −103.65479 | 1.651 | | | |
| 50 | −38.91659 | 2.829 | 1.48749 | 70.24 | 0.53007 |
| 51 | −23.85286 | 1.035 | 1.88384 | 39.19 | 0.57319 |
| 52 | 170.20573 | 0.987 | | | |
| 53 | 106.70444 | 6.394 | 1.48749 | 70.24 | 0.53007 |
| 54 | −27.09617 | 0.000 | | | |
| 55 | ∞ | 33.000 | 1.60859 | 46.44 | 0.56664 |
| 56 | ∞ | 13.200 | 1.51633 | 64.05 | 0.53463 |
| 57 | ∞ | 11.778 | | | |

TABLE 19

Example 8

| | WIDE | MIDDLE | TELE |
|---|---|---|---|
| Zr | 1.0 | 21.8 | 48.2 |
| f | 9.923 | 216.621 | 478.275 |
| FNo. | 2.06 | 2.08 | 4.59 |
| 2ω (°) | 61.6 | 3.0 | 1.4 |
| DD[10] | 1.235 | 48.496 | 47.489 |
| DD[12] | 1.800 | 86.107 | 95.584 |

TABLE 19-continued

Example 8

| | WIDE | MIDDLE | TELE |
|---|---|---|---|
| DD[19] | 51.098 | 2.278 | 15.200 |
| DD[23] | 106.182 | 2.926 | 2.958 |
| DD[28] | 1.709 | 22.217 | 0.793 |

Example 9

Figure 10:
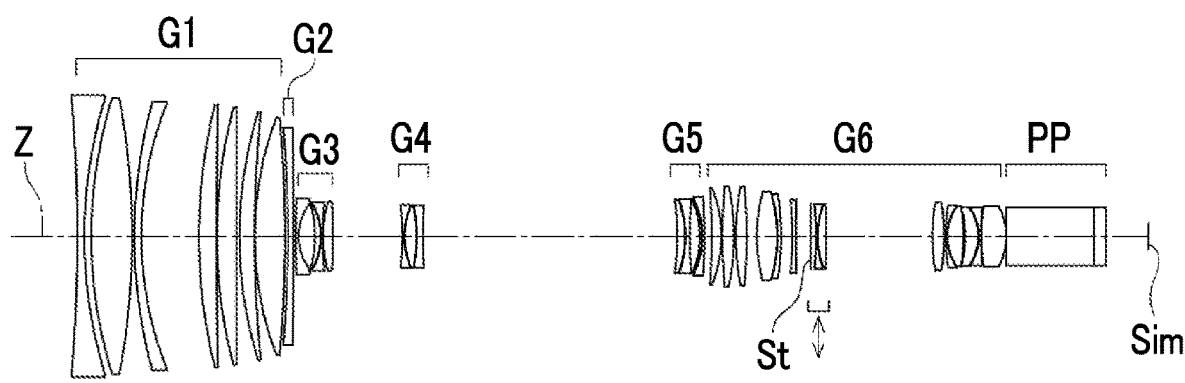
FIG. 10 is a diagram illustrating a cross-sectional view of a configuration of a zoom lens according to Example 9 of the present invention and a movement locus thereof.
Figure 10:
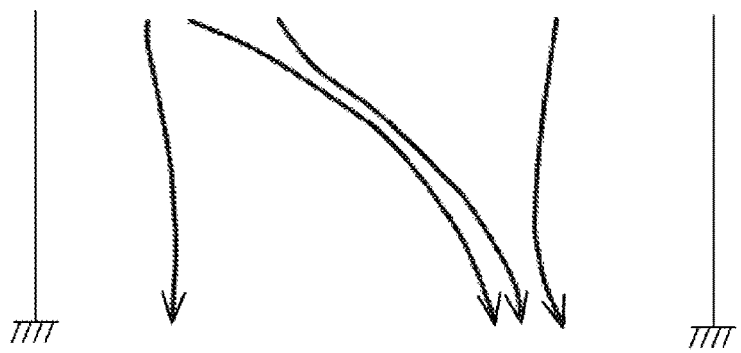
Figure 10:
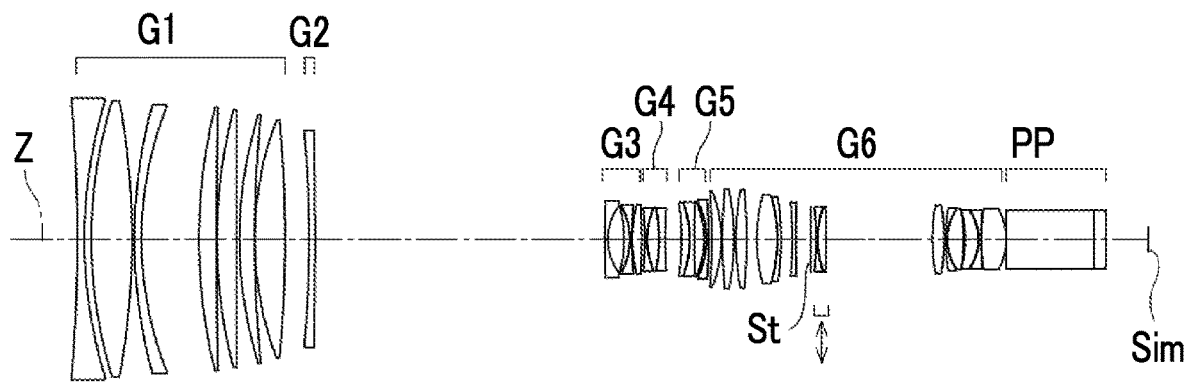

FIG. 10 is a cross-sectional view illustrating a configuration of the zoom lens of Example 9. The zoom lens of Example 9 consists of, in order from the object side to the image side, a first lens group G1 having a positive refractive power; a second lens group G2 having a negative refractive power; a third lens group G3 having a negative refractive power; a fourth lens group G4 having a negative refractive power; a fifth lens group G5 having a negative refractive power; and a sixth lens group G6 having a positive refractive power. The sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the direction of the optical axis by changing the distance between lens groups adjacent to each other. The vibration reduction group consists of a seventh lens and an eighth lens from the object side in the sixth lens group G6.

Figure 20:
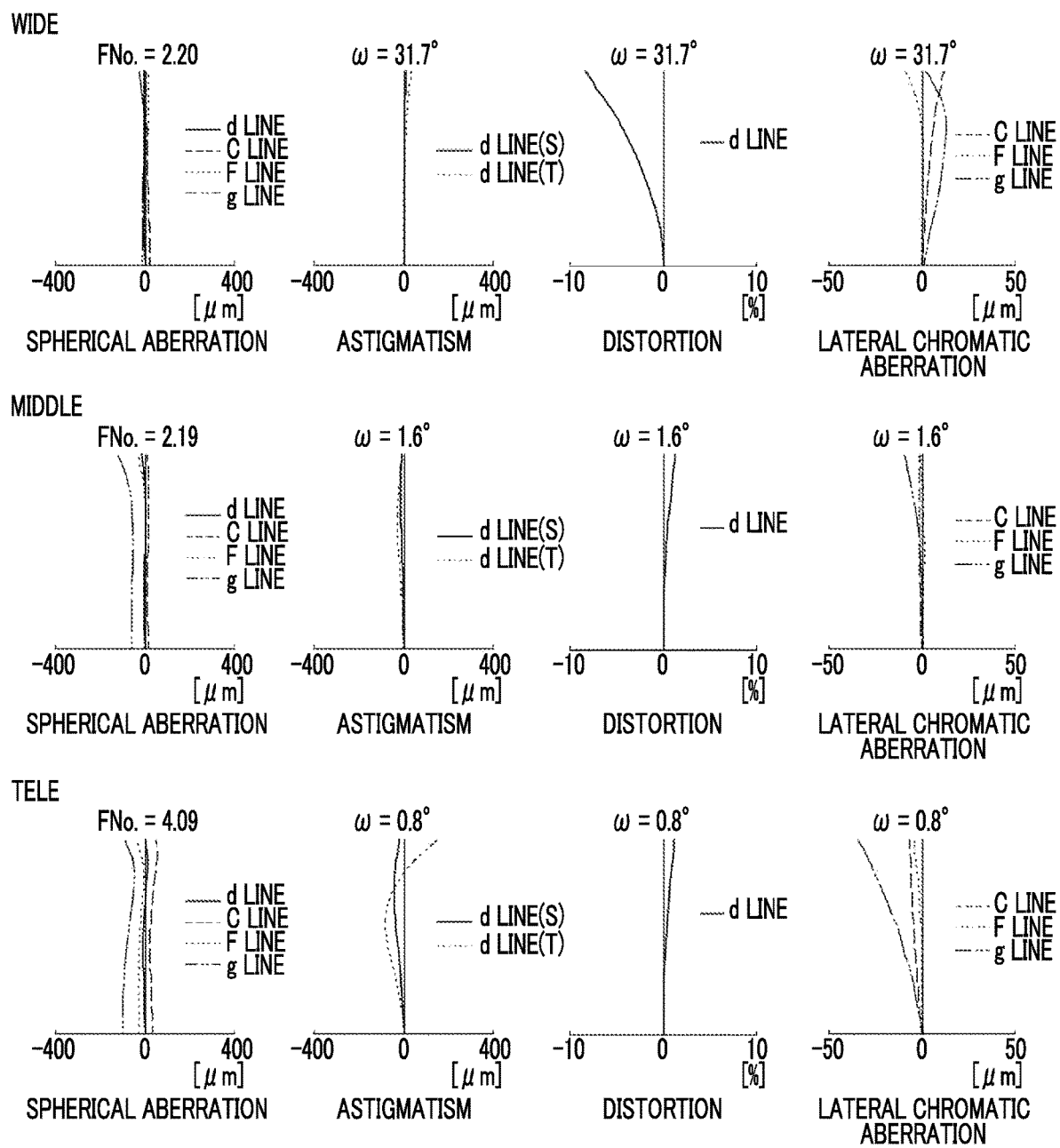
FIG. 20 is a diagram of aberrations of the zoom lens of Example 9 of the present invention.

Tables 20A and 20B show basic lens data of the zoom lens of Example 9, Table 21 shows a specification and variable surface distances, and FIG. 20 shows aberration diagrams in a state where the object at infinity is in focus.

TABLE 20A

Example 9

| Sn | R | D | Nd | vd | θgF |
|---|---|---|---|---|---|
| 1 | −1220.13577 | 5.000 | 1.80399 | 46.82 | 0.55726 |
| 2 | 358.76069 | 5.000 | | | |
| 3 | 357.20536 | 29.353 | 1.43387 | 95.18 | 0.53733 |
| 4 | −574.76469 | 1.657 | | | |
| 5 | 393.29772 | 5.000 | 1.50001 | 64.57 | 0.53363 |
| 6 | 273.44988 | 41.425 | | | |
| 7 | 414.08402 | 12.733 | 1.43387 | 95.18 | 0.53733 |
| 8 | 4909.52506 | 0.151 | | | |
| 9 | 385.64581 | 14.025 | 1.43387 | 95.18 | 0.53733 |
| 10 | 6158305.95786 | 2.127 | | | |
| 11 | 315.28961 | 11.043 | 1.49417 | 80.90 | 0.53650 |
| 12 | 924.73552 | 0.120 | | | |
| 13 | 254.93587 | 21.751 | 1.43387 | 95.18 | 0.53733 |
| 14 | −957.57613 | DD[14] | | | |
| 15 | −898.69838 | 4.250 | 1.73693 | 44.45 | 0.56603 |
| 16 | −5462.62877 | DD[16] | | | |
| 17 | 1079.38423 | 2.000 | 1.89211 | 38.96 | 0.57185 |
| 18 | 41.72948 | 11.778 | | | |
| 19 | −93.42198 | 4.201 | 1.80809 | 22.76 | 0.63073 |
| 20 | −51.48213 | 1.478 | 1.75454 | 52.55 | 0.54744 |
| 21 | 318.36630 | 0.201 | | | |
| 22 | 102.75784 | 6.738 | 1.80809 | 22.76 | 0.63073 |
| 23 | −534.64079 | DD[23] | | | |
| 24 | −232.09740 | 1.566 | 1.48851 | 81.77 | 0.53608 |
| 25 | 57.76665 | 8.696 | 1.66073 | 43.58 | 0.56926 |
| 26 | −114.26206 | 4.528 | 1.93298 | 34.80 | 0.58329 |
| 27 | 469.88568 | DD[27] | | | |
| 28 | −211.30512 | 5.778 | 1.80809 | 22.76 | 0.63073 |
| 29 | −84.06941 | 3.475 | 1.59422 | 64.88 | 0.54229 |
| 30 | 827.86761 | 6.873 | | | |

TABLE 20A-continued

Example 9

| Sn | R | D | Nd | vd | θgF |
|---|---|---|---|---|---|
| 31 | −68.97962 | 1.749 | 1.59270 | 35.31 | 0.59336 |
| 32 | −64.44879 | 1.591 | 1.69560 | 59.05 | 0.54348 |
| 33 | −430.94925 | DD[33] | | | |

TABLE 20B

Example 9

| Sn | R | D | Nd | vd | θgF |
|---|---|---|---|---|---|
| 34 | −527.27735 | 7.067 | 1.82879 | 45.97 | 0.56256 |
| 35 | −96.37523 | 0.716 | | | |
| 36 | 409.73047 | 8.292 | 1.59282 | 68.62 | 0.54414 |
| 37 | −183.36916 | 1.293 | | | |
| 38 | 198.12931 | 7.748 | 1.69560 | 59.05 | 0.54348 |
| 39 | −413.94221 | 7.341 | | | |
| 40 | 129.08702 | 14.867 | 1.43875 | 94.66 | 0.53402 |
| 41 | −117.67998 | 2.669 | 1.89999 | 20.00 | 0.64193 |
| 42 | −216.94636 | 7.895 | | | |
| 43 | −289.21120 | 2.649 | 1.99634 | 28.23 | 0.60247 |
| 44 | 822.13351 | 10.822 | | | |
| 45 (St) | ∞ | 3.920 | | | |
| 46 | −199.69969 | 1.000 | 1.84695 | 30.50 | 0.59888 |
| 47 | 77.58579 | 0.120 | | | |
| 48 | 67.16177 | 5.642 | 1.55072 | 54.68 | 0.55117 |
| 49 | −5938.52043 | 77.186 | | | |
| 50 | 142.16676 | 8.574 | 1.87394 | 21.33 | 0.63476 |
| 51 | −145.94626 | 1.137 | | | |
| 52 | 153.29658 | 1.000 | 1.89275 | 35.68 | 0.58222 |
| 53 | 39.70983 | 11.793 | 1.63246 | 63.77 | 0.54215 |
| 54 | −144.99090 | 1.180 | | | |
| 55 | −85.30121 | 9.441 | 1.48749 | 70.24 | 0.53007 |
| 56 | −39.82846 | 1.880 | 1.88846 | 39.15 | 0.57261 |
| 57 | 264.80405 | 0.131 | | | |
| 58 | 154.42119 | 18.143 | 1.48749 | 70.24 | 0.53007 |
| 59 | −48.72863 | 0.000 | | | |
| 60 | ∞ | 63.000 | 1.60863 | 46.60 | 0.56787 |
| 61 | ∞ | 8.500 | 1.51633 | 64.14 | 0.53531 |
| 62 | ∞ | 30.796 | | | |

TABLE 21

Example 9

| | WIDE | MIDDLE | TELE |
|---|---|---|---|
| Zr | 1.0 | 20.4 | 40.0 |
| f | 16.600 | 339.462 | 663.984 |
| FNo. | 2.20 | 2.19 | 4.09 |
| 2ω (°) | 63.4 | 3.2 | 1.6 |
| DD[14] | 2.182 | 19.035 | 17.807 |
| DD[16] | 1.822 | 193.121 | 208.383 |
| DD[23] | 50.199 | 7.427 | 2.308 |
| DD[27] | 182.811 | 5.587 | 11.627 |
| DD[33] | 5.330 | 17.174 | 2.219 |

Example 10

Figure 11:
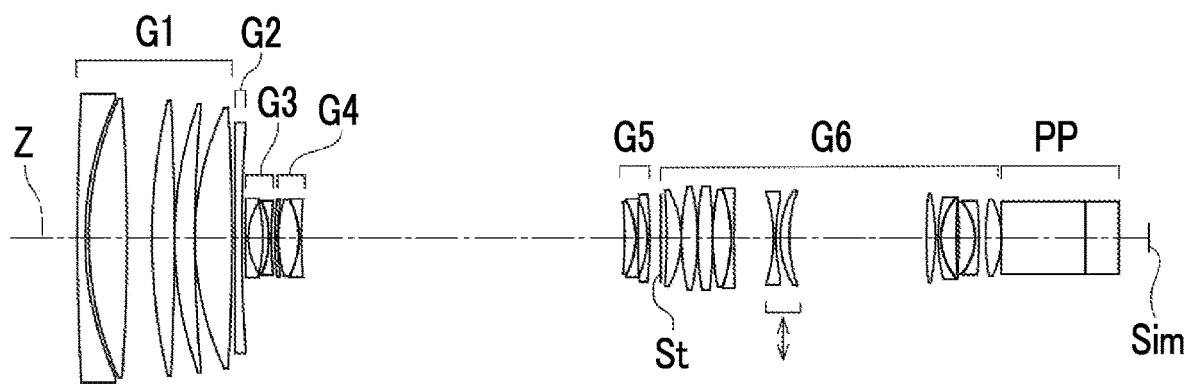
FIG. 11 is a diagram illustrating a cross-sectional view of a configuration of a zoom lens according to Example 10 of the present invention and a movement locus thereof.
Figure 11:
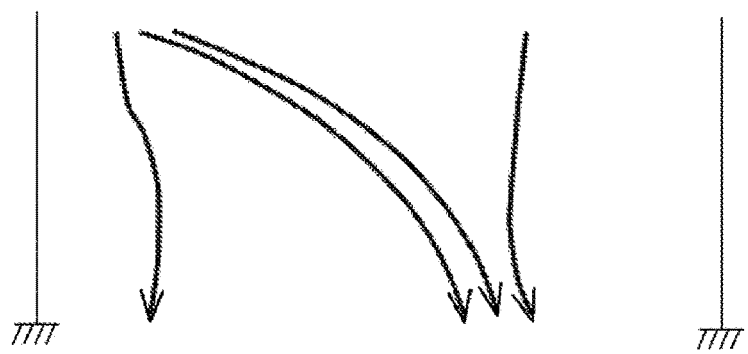
Figure 11:
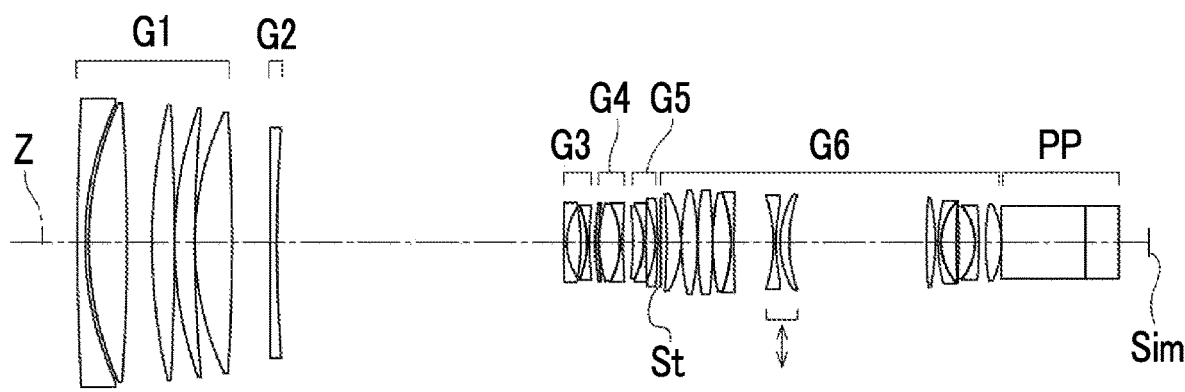

FIG. 11 is a cross-sectional view illustrating a configuration of the zoom lens of Example 10. The zoom lens of Example 10 consists of, in order from the object side to the image side, a first lens group G1 having a positive refractive power; a second lens group G2 having a negative refractive power; a third lens group G3 having a negative refractive power; a fourth lens group G4 having a positive refractive power; a fifth lens group G5 having a negative refractive power; and a sixth lens group G6 having a positive refractive power. The sixth lens group G6 corresponds to the rear group Gr. During zooming, the first lens group G1 and the sixth lens group G6 remain with respect to the image plane Sim, and the second lens group G2, the third lens group G3, the fourth lens group G4, and the fifth lens group G5 move in the direction of the optical axis by changing the distance between lens groups adjacent to each other. The vibration reduction group consists of a sixth lens and a seventh lens from the object side in the sixth lens group G6.

Figure 21:
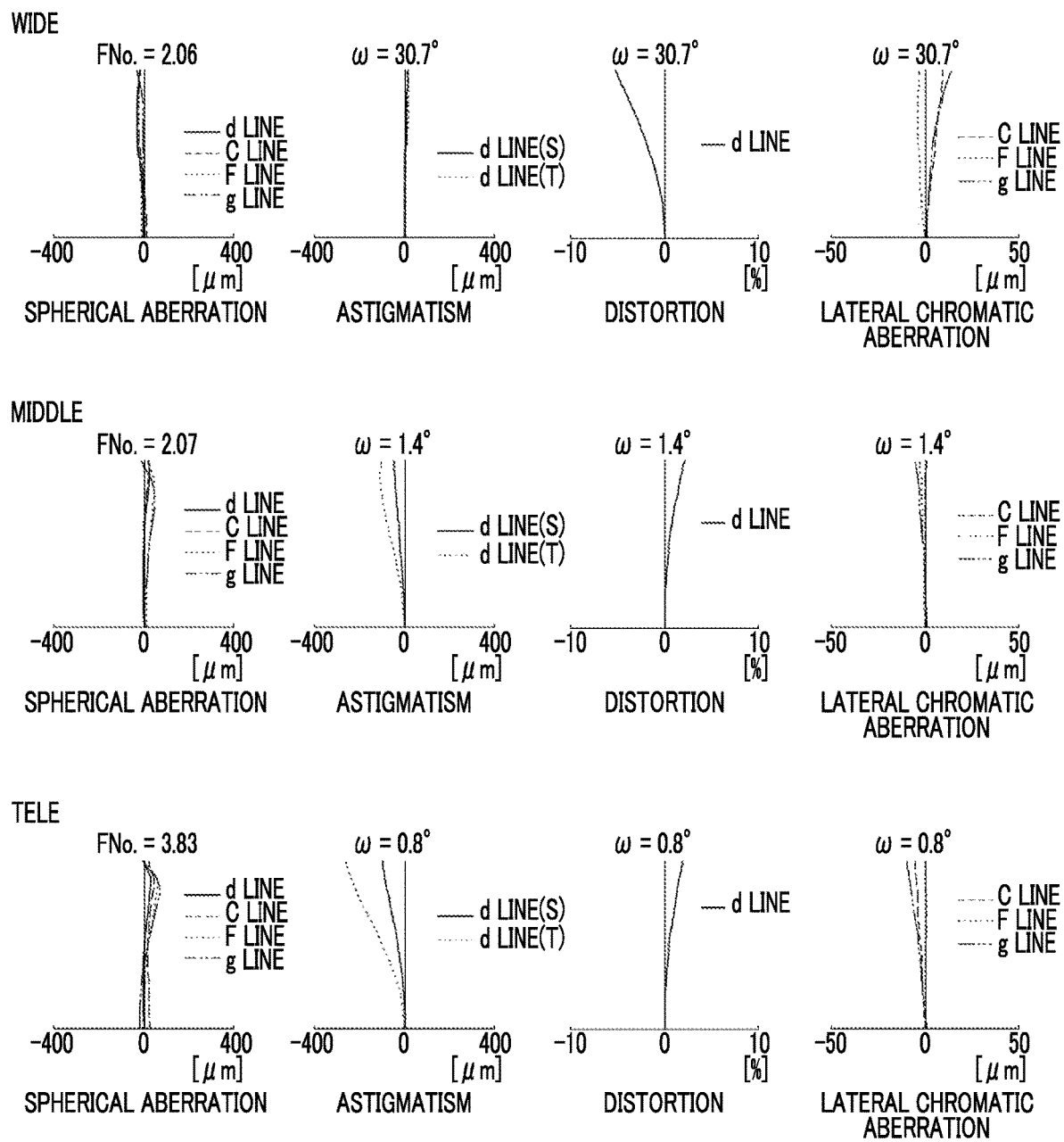
FIG. 21 is a diagram of aberrations of the zoom lens of Example 10 of the present invention.

Tables 22A and 22B show basic lens data of the zoom lens of Example 10, Table 23 shows a specification and variable surface distances, and FIG. 21 shows aberration diagrams in a state where the object at infinity is in focus.

TABLE 22A

Example 10

| Sn | R | D | Nd | vd | θgF |
|---|---|---|---|---|---|
| 1 | 1112.31358 | 3.000 | 1.80400 | 46.53 | 0.55775 |
| 2 | 138.70487 | 1.500 | | | |
| 3 | 142.29344 | 15.000 | 1.43387 | 95.18 | 0.53733 |
| 4 | −793.52276 | 9.765 | | | |
| 5 | 252.12434 | 8.839 | 1.43387 | 95.18 | 0.53733 |
| 6 | −1088.63232 | 0.120 | | | |
| 7 | 165.45724 | 7.857 | 1.43875 | 94.66 | 0.53402 |
| 8 | 595.84702 | 0.120 | | | |
| 9 | 126.15495 | 14.550 | 1.43387 | 95.18 | 0.53733 |
| 10 | −957.08810 | DD[10] | | | |
| 11 | −31924.37566 | 2.550 | 1.49700 | 81.54 | 0.53748 |
| 12 | 632.53207 | DD[12] | | | |
| 13 | 1795.94456 | 1.100 | 1.91082 | 35.25 | 0.58224 |
| 14 | 26.73843 | 5.687 | | | |
| 15 | −75.49340 | 2.481 | 1.89286 | 20.36 | 0.63944 |
| 16 | −38.22279 | 0.960 | 1.89415 | 38.42 | 0.57236 |
| 17 | 140.08284 | DD[17] | | | |
| 18 | 132.80019 | 1.200 | 1.90000 | 20.00 | 0.64194 |
| 19 | 153.34406 | 0.120 | | | |
| 20 | 52.22230 | 8.316 | 1.83084 | 24.78 | 0.61428 |
| 21 | −34.18124 | 0.960 | 1.91082 | 35.25 | 0.58224 |
| 22 | 176.54073 | DD[22] | | | |
| 23 | −138.75625 | 4.212 | 1.89999 | 20.00 | 0.63131 |
| 24 | −32.00449 | 0.970 | 1.89826 | 38.17 | 0.57287 |
| 25 | 450.63241 | 3.659 | | | |
| 26 | −36.12835 | 1.002 | 1.73016 | 55.44 | 0.55486 |
| 27 | −172.61419 | DD[27] | | | |

TABLE 22B

Example 10

| Sn | R | D | Nd | vd | θgF |
|---|---|---|---|---|---|
| 28 (St) | ∞ | 2.393 | | | |
| 29 | −243.93845 | 5.572 | 1.70660 | 57.70 | 0.55302 |
| 30 | −42.28676 | 0.120 | | | |
| 31 | 90.64895 | 6.358 | 1.56414 | 73.47 | 0.54225 |
| 32 | −95.77892 | 0.120 | | | |
| 33 | 138.02630 | 5.831 | 1.72345 | 56.33 | 0.54694 |
| 34 | −207.08771 | 0.120 | | | |
| 35 | 105.15705 | 7.048 | 1.58131 | 70.57 | 0.54338 |
| 36 | −60.58110 | 1.280 | 1.89768 | 20.12 | 0.63083 |
| 37 | 930.16930 | 15.374 | | | |
| 38 | −62.95901 | 1.000 | 1.87900 | 40.10 | 0.56810 |
| 39 | 74.91231 | 1.758 | | | |
| 40 | 38.87392 | 3.534 | 1.90000 | 20.00 | 0.63132 |
| 41 | 58.11236 | 54.178 | | | |
| 42 | 227.49450 | 3.560 | 1.78471 | 26.42 | 0.60865 |
| 43 | −82.15633 | 1.000 | | | |
| 44 | 66.48865 | 1.222 | 1.88793 | 38.23 | 0.57517 |
| 45 | 25.26214 | 5.910 | 1.63270 | 63.74 | 0.54217 |
| 46 | 199.49757 | 1.000 | | | |
| 47 | −415.64898 | 6.392 | 1.48749 | 70.24 | 0.53007 |
| 48 | −23.20872 | 1.494 | 1.85573 | 42.40 | 0.56526 |
| 49 | −167.50500 | 2.693 | | | |
| 50 | 95.77775 | 6.190 | 1.48749 | 70.24 | 0.53007 |
| 51 | −36.61146 | 0.000 | | | |
| 52 | ∞ | 33.000 | 1.60859 | 46.44 | 0.56664 |
| 53 | ∞ | 13.200 | 1.51633 | 64.05 | 0.53463 |
| 54 | ∞ | 11.848 | | | |

TABLE 23

Example 10

| | WIDE | MIDDLE | TELE |
|---|---|---|---|
| Zr | 1.0 | 21.8 | 40.5 |
| f | 9.935 | 216.686 | 401.719 |
| FNo. | 2.06 | 2.07 | 3.83 |
| 2ω (°) | 61.4 | 2.8 | 1.6 |
| DD[10] | 1.200 | 17.357 | 15.084 |
| DD[12] | 1.510 | 103.557 | 113.125 |
| DD[17] | 1.377 | 2.191 | 2.106 |
| DD[22] | 127.032 | 4.658 | 3.951 |
| DD[27] | 4.295 | 7.651 | 1.149 |

Table 24 shows values corresponding to Conditional Expressions (1), (2A), (2B), and (3) to (9) of the zoom lenses of Examples 1 to 10. In Examples 1 to 10, the d line is set as the reference wavelength. Table 24 shows the values on the d line basis.

| Expression Number | | Example 1 | Example 2 | Example 3 | Example 4 | Example 5 |
|---|---|---|---|---|---|---|
| (1) | Db12/f1 | 0.25 | 0.09 | 0.08 | 0.02 | 0.01 |
| (2A), (2B) | $1/\beta 2t$ | 0.91 | 0.87 | 0.94 | 0.91 | 0.86 |
| (3) | f3/f2 | 0.024 | 0.024 | 0.012 | 0.019 | 0.031 |
| (4) | Db13/D3wt | 0.036 | 0.030 | 0.040 | 0.046 | 0.045 |
| (5) | f1/f2 | −0.13 | −0.16 | −0.07 | −0.10 | −0.15 |
| (6) | Nave + 0.006 × vave | 2.00 | 1.99 | 2.01 | 1.99 | 1.98 |
| (7) | ft/f1 | 2.8 | 3.0 | 2.5 | 3.0 | 3.3 |
| (8) | βr | −1.2 | −2.1 | −1.1 | −1.1 | −1.2 |
| (9) | β3rt/β3rw | 45.9 | 41.1 | 40.6 | 44.3 | 44.3 |

| Expression Number | | Example 6 | Example 7 | Example 8 | Example 9 | Example 10 |
|---|---|---|---|---|---|---|
| (1) | Db12/f1 | 0.10 | 0.26 | 0.28 | 0.08 | 0.10 |
| (2A), (2B) | $1/\beta 2t$ | 0.94 | 0.79 | 0.93 | 0.85 | 0.90 |
| (3) | f3/f2 | 0.011 | 0.065 | 0.017 | 0.034 | 0.014 |
| (4) | Db13/D3wt | 0.039 | 0.043 | 0.040 | 0.037 | 0.042 |

-continued

| | | | | | | |
|---|---|---|---|---|---|---|
| (5) | f1/f2 | −0.07 | −0.31 | −0.10 | −0.16 | −0.12 |
| (6) | Nave + 0.006 × vave | 1.99 | 1.99 | 1.99 | 2.01 | 1.99 |
| (7) | ft/f1 | 2.5 | 3.1 | 2.8 | 2.9 | 2.7 |
| (8) | βr | −1.2 | −1.3 | −1.1 | −1.7 | −1.8 |
| (9) | β3rt/β3rw | 40.8 | 50.2 | 49.5 | 40.5 | 40.9 |

As can be seen from the above data, the zoom lenses of Examples 1 to 10 are compact and lightweight, have a high magnification of 40 times or more, and are realized as high-resolution optical systems in which various aberrations are satisfactorily corrected.

Figure 22:
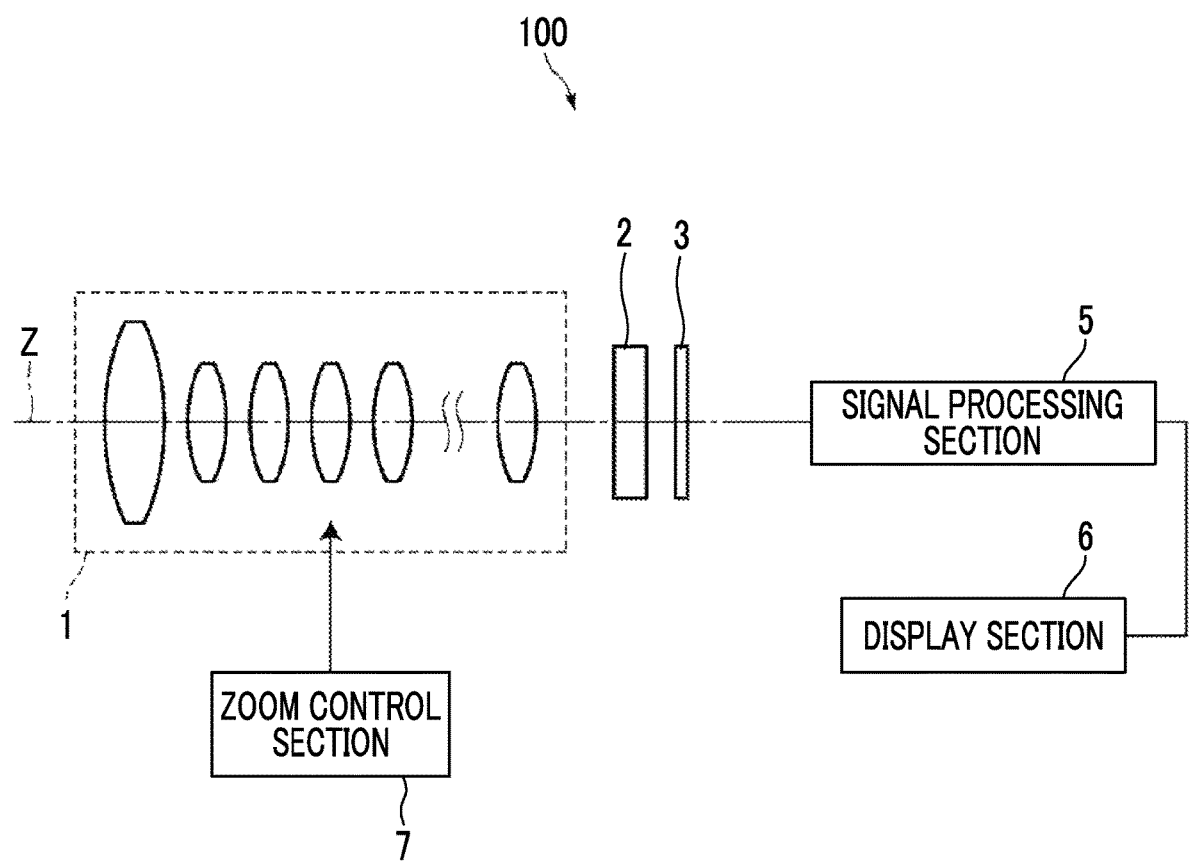
FIG. 22 is a schematic configuration diagram of an imaging apparatus according to an embodiment of the present invention.

Next, an imaging apparatus according to an embodiment of the present invention will be described. FIG. 22 is a schematic configuration diagram of an imaging apparatus 100 using the zoom lens 1 according to the above-mentioned embodiment of the present invention as an example of an imaging apparatus of an embodiment of the present invention. Examples of the imaging apparatus 100 include a broadcast camera, a movie imaging camera, a video camera, a surveillance camera, and the like.

The imaging apparatus 100 comprises a zoom lens 1, a filter 2 which is disposed on the image side of the zoom lens 1, and an imaging element 3 which is disposed on the image side of the filter 2. FIG. 22 schematically show a plurality of lenses provided in the zoom lens 1.

The imaging element 3 converts an optical image, which is formed through the zoom lens 1, into an electrical signal. For example, it is possible to use a charge coupled device (CCD), complementary metal oxide semiconductor (CMOS), or the like. The imaging element 3 is disposed such that the imaging surface thereof is coplanar with the image plane of the zoom lens 1.

The imaging apparatus 100 also comprises a signal processing section 5 which performs calculation processing on an output signal from the imaging element 3, a display section 6 which displays an image formed by the signal processing section 5, and a zoom control section 7 which controls zooming of the zoom lens 1. Although only one imaging element 3 is shown in FIG. 22, a so-called three-plate imaging apparatus having three imaging elements may be used.

The technology of the present invention has been hitherto described through embodiments and examples, but the technology of the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

What is claimed is:

1. A zoom lens consisting of, in order from an object side to an image side:
a first lens group that remains stationary with respect to an image plane during zooming and has a positive refractive power;
a second lens group that moves along an optical axis during zooming and has a negative refractive power;
a third lens group that moves along the optical axis during zooming and has a negative refractive power;
at least one lens group that moves along the optical axis during zooming; and
a rear group that remains stationary with respect to the image plane during zooming,
wherein all distances between the lens groups adjacent to each other change during zooming,
wherein the second lens group consists of one negative lens,
wherein a zoom position at which the second lens group is located to be closest to the image side during zooming is between a wide-angle end and a telephoto end,
wherein assuming that
a distance on the optical axis between a lens surface closest to the image side in the first lens group and a lens surface closest to the object side in the second lens group at the telephoto end is Db12, and
a focal length of the first lens group is f1,
Conditional Expression (1) is satisfied, which is represented by $$0.004 < Db12/f1 < 0.8 \tag{1}$$

and
wherein assuming that
a focal length of the first lens group is f1, and
a focal length of the second lens group is f2,
Conditional Expression (5) is satisfied, which is represented by $$-0.4 < f1/f2 < -0.01 \tag{5}$$

2. The zoom lens according to claim 1, wherein assuming that a lateral magnification of the second lens group at the telephoto end is β2t, Conditional Expression (2A) is satisfied, which is represented by $$0.1 < 1/\beta 2t < 1 \tag{2A}$$

3. The zoom lens according to claim 1, wherein assuming that
a focal length of the second lens group is f2, and
a focal length of the third lens group is f3,
Conditional Expression (3) is satisfied, which is represented by $$0.001 < f3/f2 < 0.375 \tag{3}$$

4. The zoom lens according to claim 1, wherein assuming that
a distance on the optical axis between the lens surface closest to the image side in the first lens group and a lens surface closest to the object side in the third lens group at the wide-angle end is Db13, and
a difference in a direction of the optical axis between a position of the third lens group at the wide-angle end and a position of the third lens group at the telephoto end is D3wt,
Conditional Expression (4) is satisfied, which is represented by $$0.01 < Db13/D3wt < 0.12 \tag{4}$$

5. The zoom lens according to claim 1, wherein assuming that an average value of refractive indexes of all lenses included in the second lens group based on a d line is Nave, and an average value of Abbe numbers of all the lenses included in the second lens group based on the d line is vave, Conditional Expression (6) is satisfied, which is represented by $$1.8 < Nave + 0.006 \times vave < 2.1 \quad (6).$$

6. The zoom lens according to claim 1, wherein assuming that a focal length of the zoom lens at the telephoto end is ft, and a focal length of the first lens group is f1, Conditional Expression (7) is satisfied, which is represented by $$1 < ft/f1 < 5 \quad (7).$$

7. The zoom lens according to claim 1, wherein assuming that a lateral magnification of the rear group is βr, Conditional Expression (8) is satisfied, which is represented by $$-5 < \beta r < -1 \quad (8).$$

8. The zoom lens according to claim 1, wherein assuming that a combined lateral magnification of the third lens group, the at least one lens group, and the rear group at the wide-angle end is β3rw, and a combined lateral magnification of the third lens group, the at least one lens group, and the rear group at the telephoto end is β3rt, Conditional Expression (9) is satisfied, which is represented by $$5 < \beta 3rt/\beta 3rw < 150 \quad (9).$$

9. The zoom lens according to claim 1, wherein the third lens group moves constantly from the object side to the image side during zooming from the wide-angle end to the telephoto end.

10. The zoom lens according to claim 1, wherein the lens group disposed to be adjacent to the object side in the rear group has a negative refractive power.

11. The zoom lens according to claim 1, wherein the rear group includes a vibration reduction group that performs image blur correction by moving in a direction intersecting the optical axis.

12. The zoom lens according to claim 1, wherein Conditional Expression (1-1) is satisfied, which is represented by $$0.005 < Db12/f1 < 0.55 \quad (1-1).$$

13. The zoom lens according to claim 2, wherein Conditional Expression (2A-1) is satisfied, which is represented by $$0.52 < 1/\beta 2t < 0.99 \quad (2A-1).$$

14. The zoom lens according to claim 3, wherein Conditional Expression (3-1) is satisfied, which is represented by $$0.005 < f3/f2 < 0.24 \quad (3-1).$$

15. The zoom lens according to claim 4, wherein Conditional Expression (4-1) is satisfied, which is represented by $$0.02 < Db13/D3\ wt < 0.085 \quad (4-1).$$

16. The zoom lens according to claim 1, wherein the zoom lens consists of five or six lens groups in which a distance between lens groups adjacent to each other changes during zooming.

17. An imaging apparatus comprising the zoom lens according to claim 1.

18. A zoom lens consisting of, in order from an object side to an image side:

a first lens group that remains stationary with respect to an image plane during zooming and has a positive refractive power;

a second lens group that moves along an optical axis during zooming and has a negative refractive power;

a third lens group that moves along the optical axis during zooming and has a negative refractive power;

at least one lens group that moves along the optical axis during zooming; and a rear group that remains stationary with respect to the image plane during zooming, wherein all distances between the lens groups adjacent to each other change during zooming, wherein assuming that a distance on the optical axis between a lens surface closest to the image side in the first lens group and a lens surface closest to the object side in the second lens group at the telephoto end is Db12, a focal length of the first lens group is f1, and a lateral magnification of the second lens group at the telephoto end is β2t, Conditional Expressions (1) and (2B) are satisfied, which are represented by $$0.004 < Db12/f1 < 0.8 \quad (1), \text{ and}$$

$$0.62 < 1/\beta 2t < 1 \quad (2B).$$

19. The zoom lens according to claim 18, wherein Conditional Expression (2B-1) is satisfied, which is represented by $$0.66 < 1/\beta 2t < 0.99 \quad (2B-1).$$

* * * * *